United States Patent [19]

Zur

[11] Patent Number: 5,508,727

[45] Date of Patent: Apr. 16, 1996

[54] APPARATUS AND METHOD FOR PATTERN GENERATION ON A DIELECTRIC SUBSTRATE

[75] Inventor: Albert Zur, Givat Savion, Israel

[73] Assignee: Imagine, Ltd., Israel

[21] Appl. No.: 306,052

[22] Filed: Sep. 14, 1994

Related U.S. Application Data

[63] Continuation-in-part of Ser. No. 944,157, Sep. 11, 1992, which is a continuation-in-part of Ser. No. 766,691, Sep. 27, 1991, Pat. No. 5,289,214, which is a continuation-in-part of Ser. No. 697,166, May 8, 1991, Pat. No. 5,157,423.

[30] Foreign Application Priority Data

Feb. 14, 1994 [IL] Israel ......................................... 108644

[51] Int. Cl.⁶ ..................................................... G01D 15/06
[52] U.S. Cl. ........................... 347/112; 347/139; 347/153
[58] Field of Search ................................. 346/153.1, 155, 346/159, 135.1, 138; 358/298; 347/112, 139, 153, 55

[56] References Cited

U.S. PATENT DOCUMENTS

| | | |
|---|---|---|
| 3,055,006 | 1/1961 | Dreyfoos, Jr. et al. . |
| 3,979,759 | 9/1976 | Simm . |
| 4,087,826 | 5/1978 | Haeberle . |
| 4,155,093 | 5/1979 | Fotland et al. . |
| 4,174,170 | 11/1979 | Yamamoto . |
| 4,207,100 | 6/1980 | Kadokura . |
| 4,397,085 | 8/1983 | Goff, Jr. et al. ................. 346/155 X |
| 4,409,604 | 10/1983 | Fotland . |
| 4,498,090 | 2/1985 | Honda . |
| 4,568,955 | 2/1986 | Hosoya . |
| 4,641,955 | 2/1987 | Yuasa . |
| 4,644,373 | 2/1987 | Sheridan . |
| 4,675,703 | 6/1987 | Fotland ............................ 346/159 |
| 4,692,779 | 9/1987 | Ando . |
| 4,748,464 | 5/1988 | Pannekoek . |
| 4,757,343 | 7/1988 | Nakatani . |
| 4,792,860 | 12/1988 | Kuehnle ........................... 346/155 X |
| 4,837,591 | 6/1989 | Snelling . |
| 4,855,768 | 8/1989 | Iino . |
| 4,903,048 | 2/1990 | Harrington . |
| 4,931,876 | 6/1990 | Hashizume . |
| 4,973,994 | 11/1990 | Schneider . |
| 5,087,944 | 2/1992 | Yamauchi . |
| 5,105,280 | 4/1992 | Ogino . |
| 5,111,302 | 5/1992 | Chan . |
| 5,150,226 | 9/1992 | Takanashi . |
| 5,157,423 | 10/1992 | Zur ................................... 346/159 |
| 5,181,072 | 1/1993 | Furuya . |
| 5,204,697 | 4/1993 | Schmidlin . |
| 5,206,784 | 4/1993 | Kimiwada . |
| 5,245,438 | 9/1993 | Yamamoto . |
| 5,250,992 | 10/1993 | Tsuneeda . |
| 5,289,214 | 2/1994 | Zur . |
| 5,323,185 | 6/1994 | Nagato et al. ................... 346/159 |

OTHER PUBLICATIONS

R. M. Schaffert, Electrophotography, 2nd Edition, Focal Press, London, 1975, pp. 166–176.

Primary Examiner—Peter S. Wong
Assistant Examiner—Randy W. Gibson
Attorney, Agent, or Firm—Townsend and Townsend and Crew

[57] ABSTRACT

Apparatus for pattern generation on a dielectric substrate including a drum having an outer pattern receiving and retaining dielectric substrate, a plurality of electrodes mounted in the drum and being arranged so as to underlie the outer pattern receiving and retaining dielectric substrate, imagewise voltage supply circuitry for imagewise application of voltage to the plurality of electrodes, and an elongate ion source operative to apply a flow of charges to the dielectric substrate in a non-imagewise manner.

27 Claims, 24 Drawing Sheets

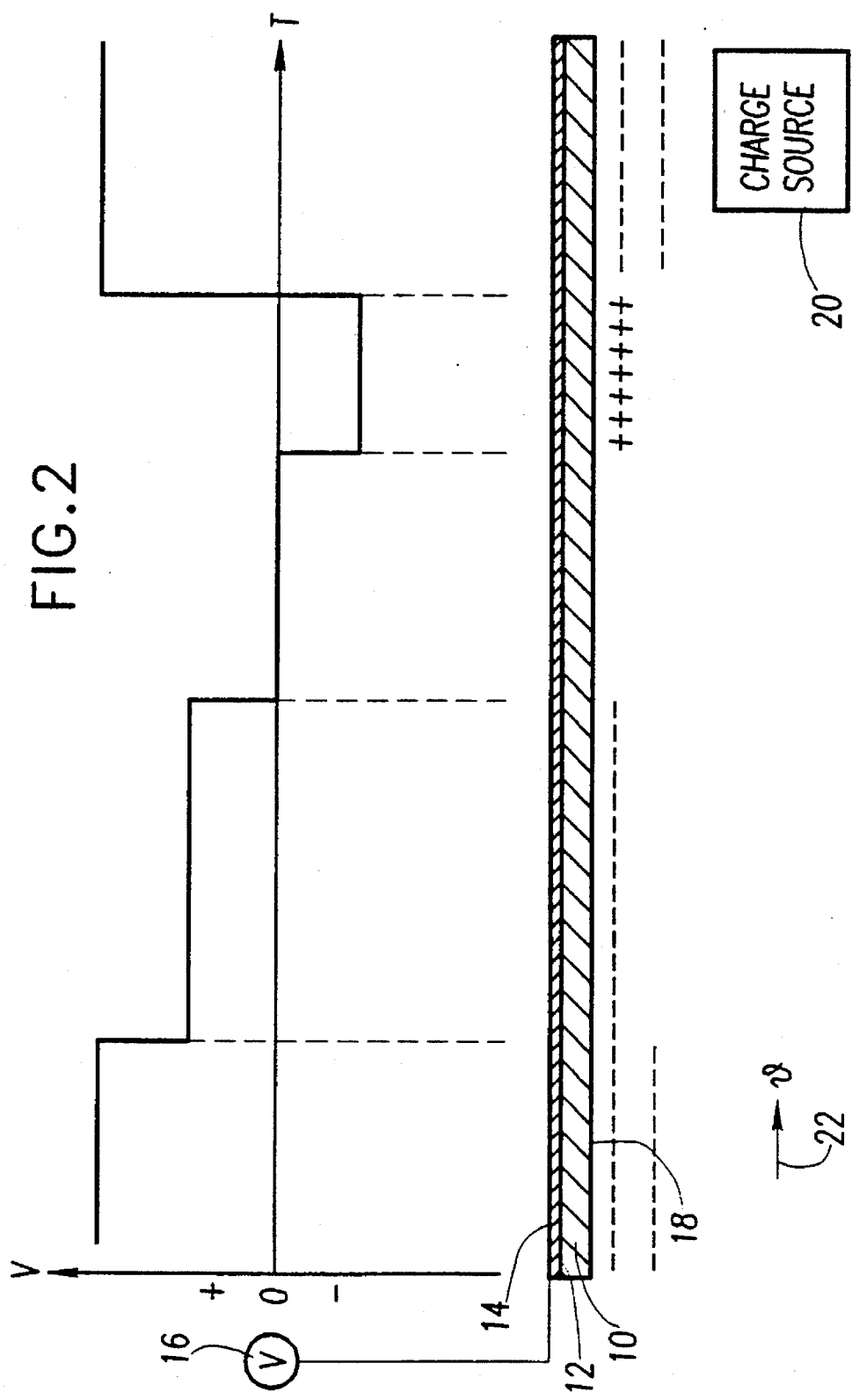

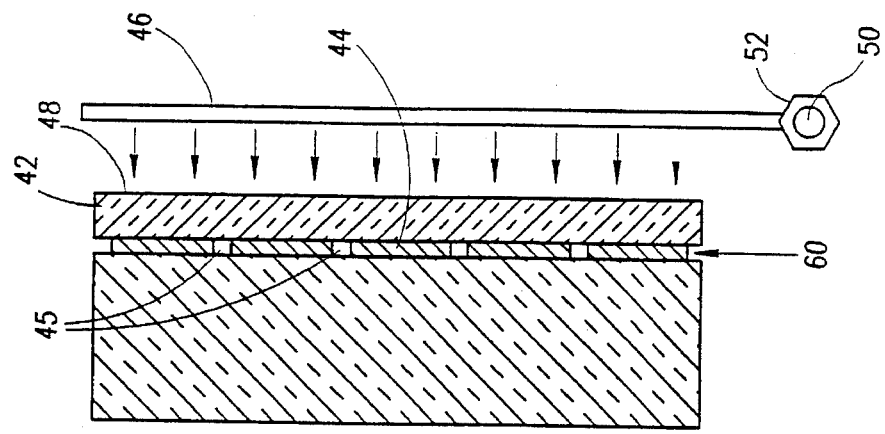
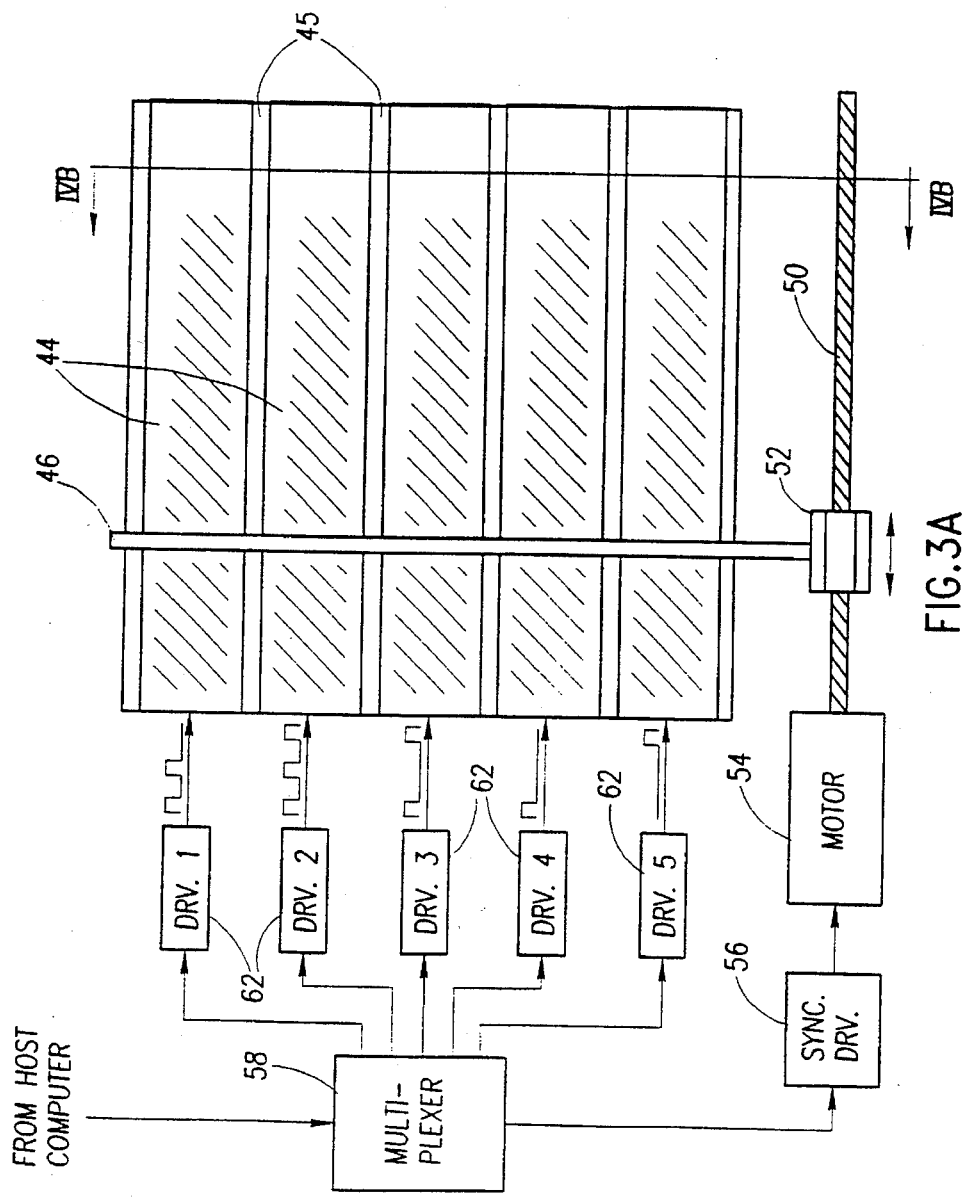
FIG.3B
FIG.3A

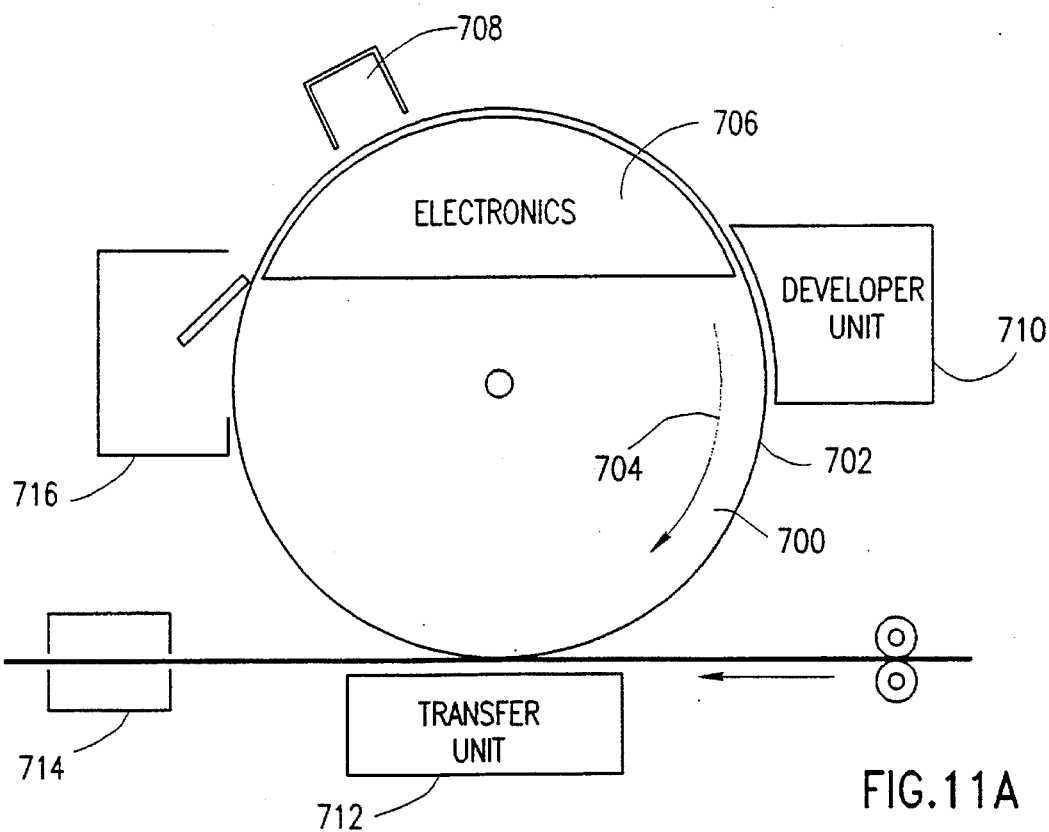
FIG.11A
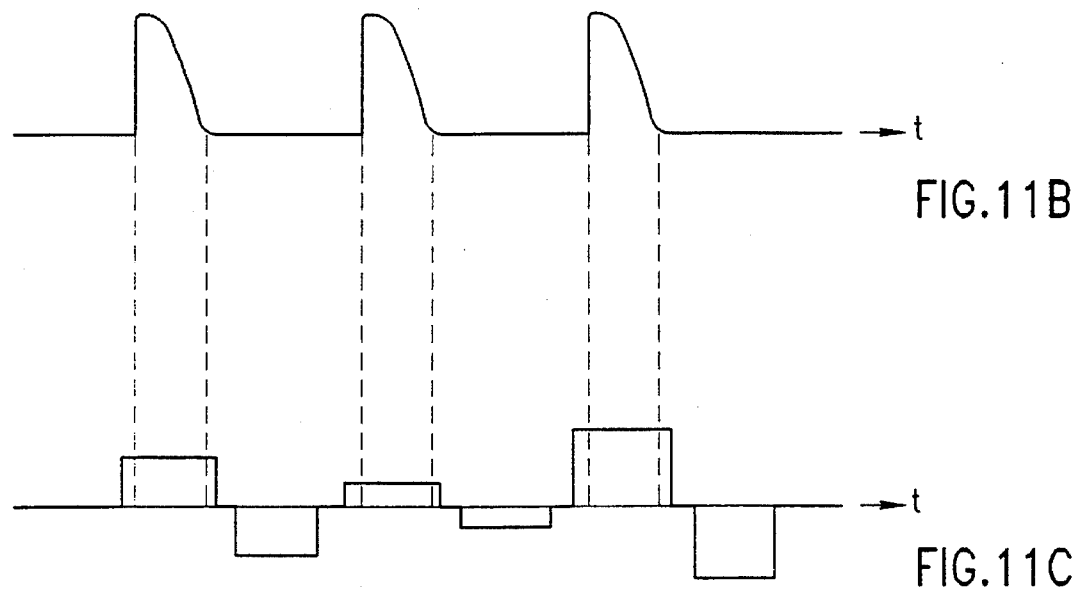
FIG.11B
FIG.11C

APPARATUS AND METHOD FOR PATTERN GENERATION ON A DIELECTRIC SUBSTRATE

REFERENCE TO APPLICATIONS

This application is a continuation-in-part of U.S. patent application Ser. No. 07/944,157 filed Sep. 11, 1992, which is a continuation-in-part of U.S. patent application Ser. No. 07/766,691, filed Sep. 27, 1991, now U.S. Pat. No. 5,289,214, which is a continuation-in-part of U.S. patent application Ser. No. 07/697,166, filed May 8, 1991, now U.S. Pat. No. 5,157,423.

FIELD OF THE INVENTION

The present invention relates to apparatus and methods for non-impact imaging and marking and more particularly to electrostatic imaging drums.

BACKGROUND OF THE INVENTION

There exist in the patent literature disclosures of a great number of techniques for non-impact printing and imaging. The most widely used of these techniques is electrophotography wherein an electrostatic image is optically formed on a photoconductor, which is then developed with a toner. The toner image is transferred to a substrate and fused thereon.

An additional technique in general use is ionography, wherein an electrostatic image is formed on a dielectric substrate by firing charges directly onto the substrate using an imagewise ion source.

A technique for the transfer of electrostatic images from a dielectric photoconductor onto a dielectric substrate has also been proposed in *Electrophotography* by R. M. Schaffert, 2nd Edition, Focal Press, London, 1975 at pages 166–176 and in U.S. Pat. No. 3,055,006. This technique, known as TESI (Transfer of Electrostatic Images) employs an imagewise optical signal to create a charge image on a photoconductor. The charge image is subsequently replicated onto a dielectric substrate by applying single polarity charges to a surface of the dielectric substrate opposite from that surface which faces the photoconductor.

SUMMARY OF THE INVENTION

There is thus provided in accordance with a preferred embodiment of the present invention apparatus for pattern generation on a dielectric substrate including a drum having an outer pattern receiving and retaining dielectric substrate, a plurality of electrodes mounted in the drum and being arranged so as to underlie the outer pattern receiving and retaining dielectric substrate, imagewise voltage supply circuitry for imagewise application of voltage to the plurality of electrodes, and an elongate ion source operative to apply a flow of charges to the dielectric substrate in a non-imagewise manner.

Further in accordance with a preferred embodiment of the present invention the imagewise voltage supply circuitry includes imaging circuitry located within the drum for controlling the application of voltage to the plurality of electrodes.

Still further in accordance with a preferred embodiment of the present invention the imagewise voltage supply circuitry may include half-tone imaging circuitry.

Additionally in accordance with a preferred embodiment of the present invention the imagewise voltage supply circuitry may include continuous tone imaging circuitry.

There is further provided in accordance with a preferred embodiment of the present invention line printing apparatus including a dielectric substrate, a plurality of electrodes arranged so as to underlie the dielectric substrate, imagewise voltage supply circuitry for imagewise application of voltage to the plurality of electrodes, and a non-imagewise elongate ion source for applying a non-imagewise flow of charges to the dielectric substrate, thereby causing a non-visible electrostatic image to appear on the dielectric substrate in accordance with the imagewise application of voltage.

Additionally in accordance with a preferred embodiment of the present invention the plurality of electrodes include elongate electrodes which extend generally perpendicular to the line.

Further in accordance with a preferred embodiment of the present invention the ion source applies the non-imagewise flow of charges to the dielectric substrate on a line-by-line basis, forming the electrostatic image on a line-by-line basis.

There is also provided in accordance with a preferred embodiment of the present invention a method for fabricating a drum useful for pattern generation including the steps of providing a cylindrical inner dielectric substrate arranged about a drum axis, forming a plurality of electrodes onto the inner dielectric substrate, forming over the plurality of electrodes an outer pattern receiving and retaining dielectric substrate, providing imaging circuitry interiorly of the inner dielectric substrate, and coupling the imaging circuitry to the plurality of electrodes.

Further in accordance with a preferred embodiment of the present invention the step of forming a plurality of electrodes includes the steps of winding a continuous electrode about the cylindrical inner dielectric substrate and cutting the electrode at plural locations thereof along at least one line parallel to the drum axis.

Still further in accordance with a preferred embodiment of the present invention the step of forming a plurality of electrodes includes the steps of providing a flexible blanket having a plurality of electrodes formed thereon, wrapping the flexible blanket about the cylindrical inner dielectric substrate and securing the flexible blanket in place.

Additionally provided in accordance with a preferred embodiment of the present invention is a method for pattern generation on a dielectric substrate including providing a drum including an outer pattern receiving and retaining dielectric substrate and a plurality of electrodes mounted in the drum and being arranged so as to underlie the outer pattern receiving and retaining dielectric substrate, operating imagewise voltage supply circuitry for imagewise application of voltage to the plurality of electrodes, and operating an elongate ion source to apply a flow of charges to the dielectric substrate in a non-imagewise manner.

Further in accordance with a preferred embodiment of the present invention the step of operating the ion source may include continuous operation of the ion source.

Still further in accordance with a preferred embodiment of the present invention the step of operating the ion source may include pulsed operation of the ion source.

Additionally in accordance with a preferred embodiment of the present invention the step of operating the imagewise voltage supply circuitry may include half-tone imaging.

Also in accordance with a preferred embodiment of the present invention the step of operating the imagewise voltage supply circuitry may include continuous tone imaging.

There is additionally provided in accordance with a preferred embodiment of the present invention a line printing method including the steps of providing a dielectric substrate and a plurality of electrodes arranged so as to underlie the dielectric substrate, operating imagewise voltage supply circuitry for imagewise application of voltage to the plurality of electrodes, and operating a non-imagewise elongate ion source for applying a non-imagewise flow of charges to the dielectric substrate, thereby causing a non-visible electrostatic image to appear on the dielectric substrate in accordance with the imagewise application of voltage.

Further in accordance with a preferred embodiment of the present invention the plurality of electrodes include elongate electrodes which extend generally perpendicular to the line.

Still further in accordance with a preferred embodiment of the present invention the ion source applies the non-imagewise flow of charges to the dielectric substrate on a line-by-line basis, forming the electrostatic image on a line-by-line basis.

BRIEF DESCRIPTION OF THE DRAWINGS

The present invention will be understood and appreciated more fully from the following detailed description, taken in conjunction with the drawings in which:

FIG. 2 is an illustration of a time varying voltage signal on a first surface of a dielectric substrate resulting in a corresponding charge pattern on an opposite surface of the dielectric substrate in accordance with a preferred embodiment of the present invention;

FIGS. 3A and 3B are respective generalized and side view illustrations, taken along the line IVB—IVB, of apparatus for applying voltage and charges to opposite surfaces of a dielectric substrate in accordance with another embodiment of the present invention;

FIG. 11A is a simplified illustration of printing apparatus constructed and operative in accordance with another preferred embodiment of the present invention;

FIGS. 11B and 11C are signal diagrams illustrating electrical signals produced by the apparatus of FIGS. 3A and 3B;

DETAILED DESCRIPTION OF A PREFERRED EMBODIMENT

Figure 1A:
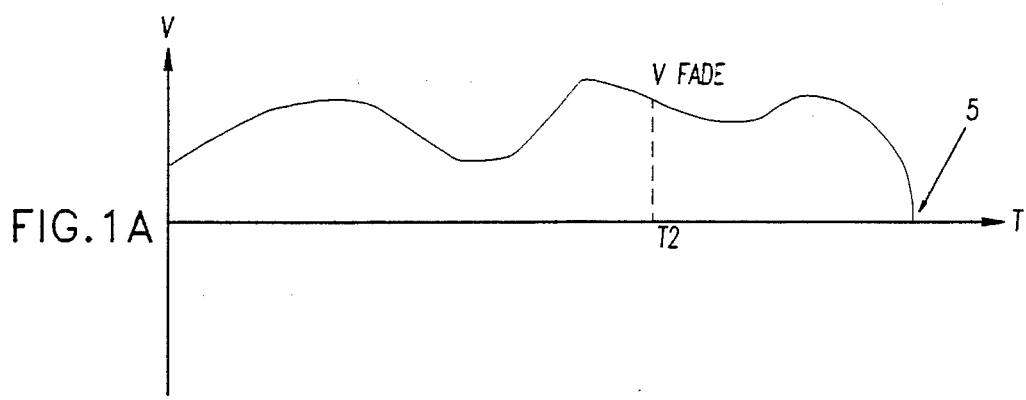
FIGS. 1A, 1B, 1C and 1D are illustrations of the application of voltage or charge on various surfaces over time in accordance with a preferred embodiment of the present invention.

Reference is now made to FIGS. 1A–1D, which illustrate the operation of the present invention. FIG. 1A illustrates an arbitrary voltage at a typical point location on a first surface of a dielectric substrate as it varies over time. The voltage may be applied to the typical point location by means of a conductive backing associated with the first surface of the dielectric substrate in touching or capacitive relationship therewith. The conductive backing may be a separate conductor in close proximity to, or alternatively a permanent coating or layer formed on, the first surface of the dielectric substrate.

Figure 1B:
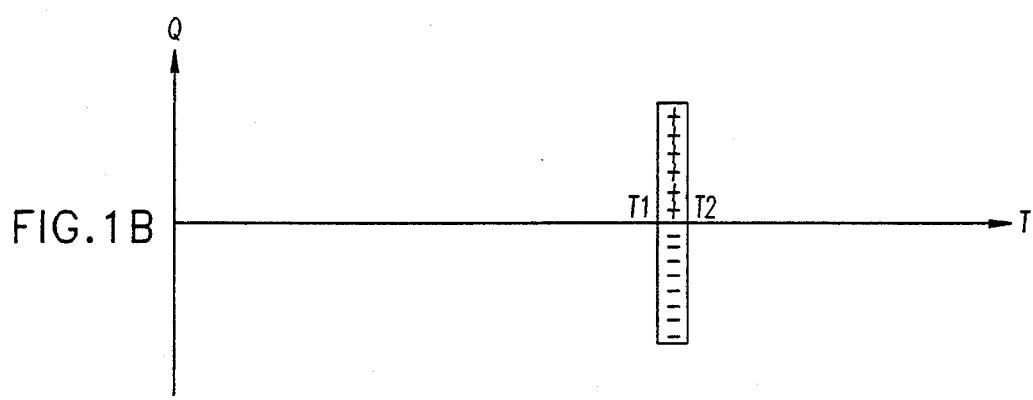

FIG. 1B illustrates, on the same time scale as in FIG. 1A, the application of a flow of charges to a second surface of the dielectric substrate, which is opposite to and generally uniformly spaced from the first surface, to temporarily neutralize the effect on the second surface of the voltage applied to the first surface. Following application of such charges the second surface retains a charge corresponding to the voltage which was applied to the first surface, at the time T2 that the application of such charges ceased, but of an opposite polarity thereto.

According to a preferred embodiment of the invention, the flow of charges comprises an alternating polarity charge flow to a second surface of the dielectric substrate which is opposite to and generally uniformly spaced from the first surface. It is preferred that the time variation of the voltage applied to any given location on the first surface be sufficiently small such that at least during an end portion of the duration of the alternating polarity charge flow at such location, the voltage variation is essentially zero.

The alternating polarity charge flow at each location is represented in FIG. 1B by a stack of positive and negative charges. The beginning and end of the duration of the application of the alternating polarity charge flow at each location are indicated in FIG. 1B respectively as T1 and T2.

Figure 1C:
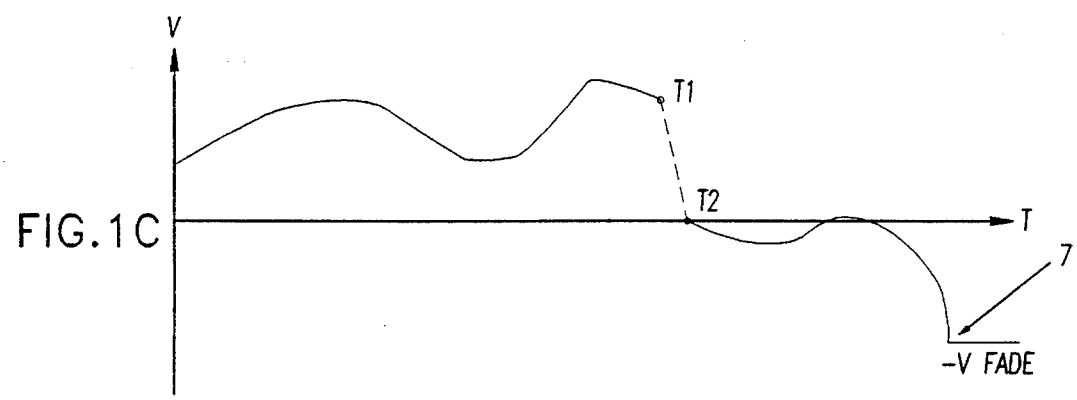

FIG. 1C illustrates the voltage on the second surface of the dielectric substrate. It is noted that this voltage tracks the voltage on the first surface until the charge flow begins at time T1. Upon termination of the charge flow at time T2, the voltage of the second surface is very nearly zero. If, thereafter, the voltage on the first surface is brought to zero, as indicated by reference numeral 5, in FIG. 1A, the voltage on the second surface becomes approximately the negative of the voltage on the first surface at time T2, due to charge accumulation on the second surface, as indicated at reference numeral 7 in FIG. 1C.

Figure 1D:
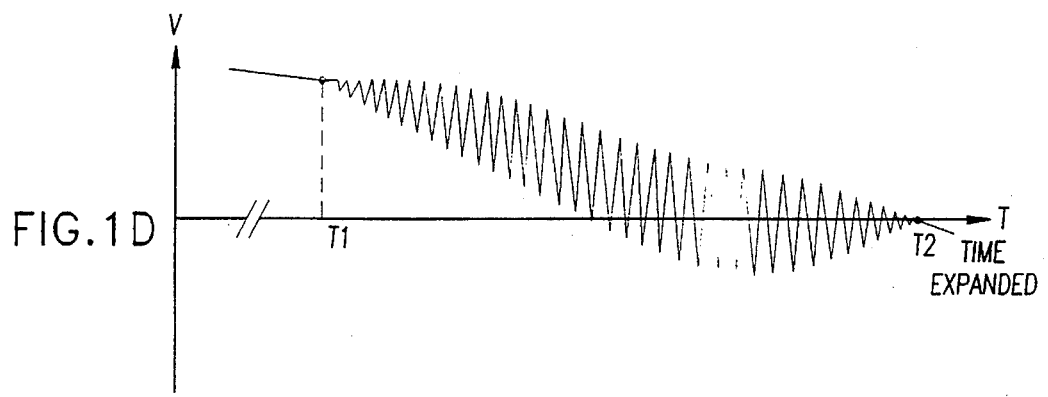

FIG. 1D is an expanded time scale illustration corresponding to FIG. 1C and illustrating with greater particularity the effect of one possible application of an alternating charge flow to the second surface, which results in a reduction in the voltage on the second surface from the voltage at T1 to very nearly zero at T2.

Referring now to FIG. 2, there is shown schematically an arbitrary voltage signal provided on a dielectric substrate 10 at a first surface 12 thereof, which is preferably backed with a conductive backing 14 to which is coupled a time-variable voltage source 16. FIG. 2 also illustrates in one dimension, the corresponding spatial charge pattern, of opposite polarity to the corresponding voltage signal, which is produced on a second surface 18 of the dielectric substrate in accordance with the present invention, by application of a flow of charges to the second surface which is operative to temporarily neutralize the effect on the second surface of the voltage applied to the first surface 12. The application of the flow of charges is preferably provided by an alternating polarity charge source (APCS) 20, such as an AC corona, capable of achieving a spatial edge accuracy consistent with the desired resolution. Such an AC corona may be realized by employing one or more corona wires or needles enclosed within a shield having a defined charge outlet opening and having an amplitude modulated or constant AC voltage supplied to the corona wire or wires.

The charge source 20 is preferably moved at a velocity v along the second surface 18 of the dielectric substrate 10, indicated by an arrow 22.

Reference is now made to FIGS. 3A and 3B which illustrate apparatus for applying voltage and charges to opposite surfaces of a dielectric substrate 42 in accordance with another embodiment of the present invention.

In this embodiment, an elongate alternating polarity charge source (EAPCS) 46, such as that described above and being capable of achieving a spatial edge accuracy consistent with the desired resolution, but employing an elongate charge source instead of a point charge source, is scanned in one dimension, perpendicular to its longitudinal axis, along a second surface 48 of substrate 42, by means of a linear drive mechanism including a worm screw 50 cooperating with a screw rider 52, fixed to source 46. An electric motor 54 drives the worm screw 50 in response to the outputs of a commercially available synchronized driver 56. A host computer (not shown) provides positioning instructions via a multiplexer 58 to driver 56.

In this embodiment, a multisectional conductive backing layer 60, typically comprising a plurality of elongate strips 44, is associated with the first surface of the dielectric substrate 42. Each strip 44 is provided with an information content modulated time varying voltage via a corresponding driver 62, in response to control signals received from the host computer via multiplexer 58.

It may be appreciated that in the embodiment of FIGS. 3A and 3B a charge pattern is written on the second surface by information content modulation of voltages applied simultaneously to the different regions of the first surface of the dielectric substrate 42 via strips 44 in synchronism with the one dimensional scanning motion of source 46.

It is appreciated that a desired two-dimensional spatial resolution may be achieved by adjusting appropriate parameters. In a first dimension, the parameters to be adjusted include the width of the elongate strips 44, the width of a gap 45 between adjacent strips 44 and the thickness of the dielectric layer 42. In a second dimension, the parameters include the edge definition of the EAPCS 46. The gaps 45 should be filled with electrically insulative dielectric material having high dielectric strength. Alternatively, gaps 45 may be filled with highly resistive material.

It is further appreciated that the write techniques described hereinabove allow an uninterrupted line of uniform width as small as one pixel to be achieved. The advantages of these techniques include the replacement of dot pixels thus eliminating holes between pixels. Accordingly, intentional overlap of pixels is not necessary.

According to an alternate embodiment of the present invention, a film may serve as dielectric substrate 42. When a charge pattern is written on the film surface, electrostatic field patterns may be induced in the film. Typically the induced electrostatic field pattern corresponds to the charge pattern.

Films whose level of optical transmission are dependent on internal electrostatic fields may be capable of serving as dielectric substrate 42. Examples of such film are thermoplastics and liquid crystal films. Typically in this embodiment conductive strips 44 are transparent.

It is appreciated that when such a film serves as the dielectric substrate, the film may operate as a spatial light modulator.

Multi-sectional conductive backing layer 60 may comprise a uniform conductive film from which a plurality of strips are created using an etching technique such as laser etching, chemical etching, or ion etching. Alternatively the multi-sectional conductive backing layer may comprise a grid comprising a weave of straight conductive wires in one dimension and insulating curved wires in a second dimension. This type of grid is available from Carbotex of Grutlistrasse 68, Zurich, Switzerland. Alternatively, the multi-sectional conductive backing layer 60 may be produced by electroforming techniques.

Drivers 62 may be implemented by using standard microelectronics and hybrids which may be connected to the conductive strips by standard microscopic bonding techniques.

Figure 4A:
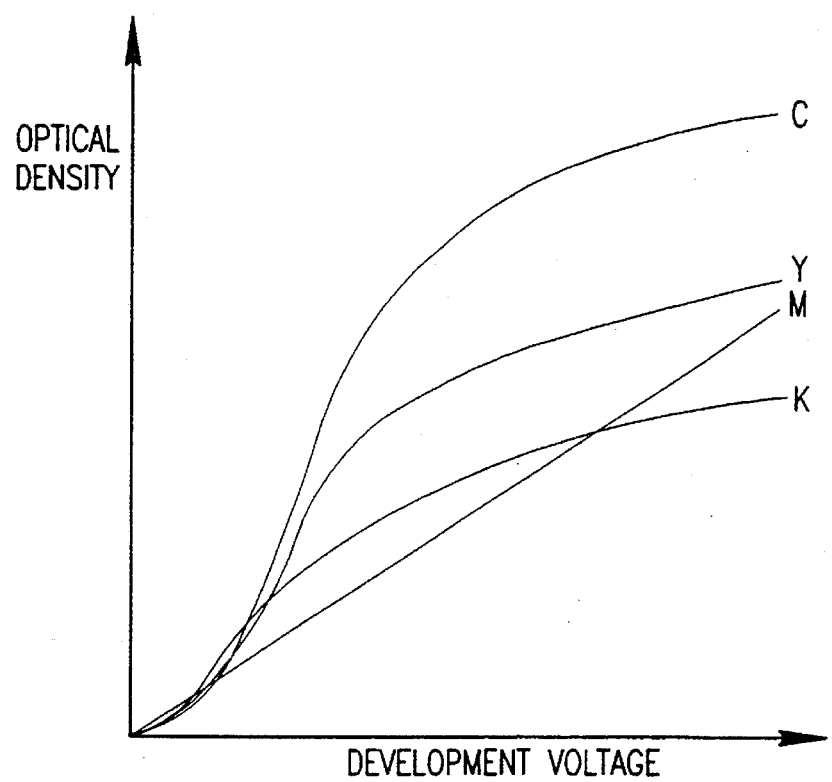
FIGS. 4A and 4B are respectively graphical and pictorial illustrations of the operational parameters of apparatus for continuous toning in accordance with a preferred embodiment of the invention.
Figure 4B:
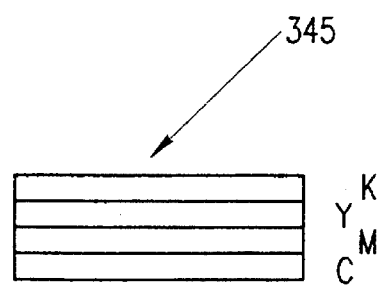

Reference is now made to FIGS. 4A and 4B which illustrate operational parameters for continuous toning apparatus in accordance with a preferred embodiment of the present invention.

It is appreciated that certain toners are characterized by the property that the optical density of a toned area can be controlled by the development voltage. Some liquid toners and certain dry toners are examples of this type of toner.

It is also appreciated that the write techniques described hereinabove are capable of writing continuous voltage levels thus enabling the generation of one-pass monochrome toned images of continuous optical densities, when toners of the type described hereinabove are used.

In accordance with a preferred embodiment of the present invention, continuous color printing using standard subtractive colors can be achieved in accordance with the write techniques described herein and standard multi-pass printing techniques.

FIG. 4A graphically demonstrates hypothetical optical densities of four basic printing colors (CMYK) typically used with subtractive color printing systems as a function of the development voltage of each of the toner colors.

FIG. 4B illustrates a single area of a color print 345 to which four basic printing colors (CMYK) have been sequentially transferred in accordance with standard multi-pass printing techniques.

The specific optical density of each color across any area may be controlled by writing (in accordance with the writing techniques described hereinabove in association with FIGS. 3A and 3B) at the corresponding area a voltage level which corresponds to the desired optical density for that color.

It is appreciated that the subtractive combination of the optical densities of each of the four basic printing colors over an area results in a color having any of a continuum of color shades.

It is also appreciated that a color shade may be uniformly distributed within the borders of an entire area. Therefore, the specific color shade desired is achieved at the level of one pixel and not as a result of the combination of several pixels.

This embodiment offers continuous control over color levels providing high quality color prints.

Figure 5:
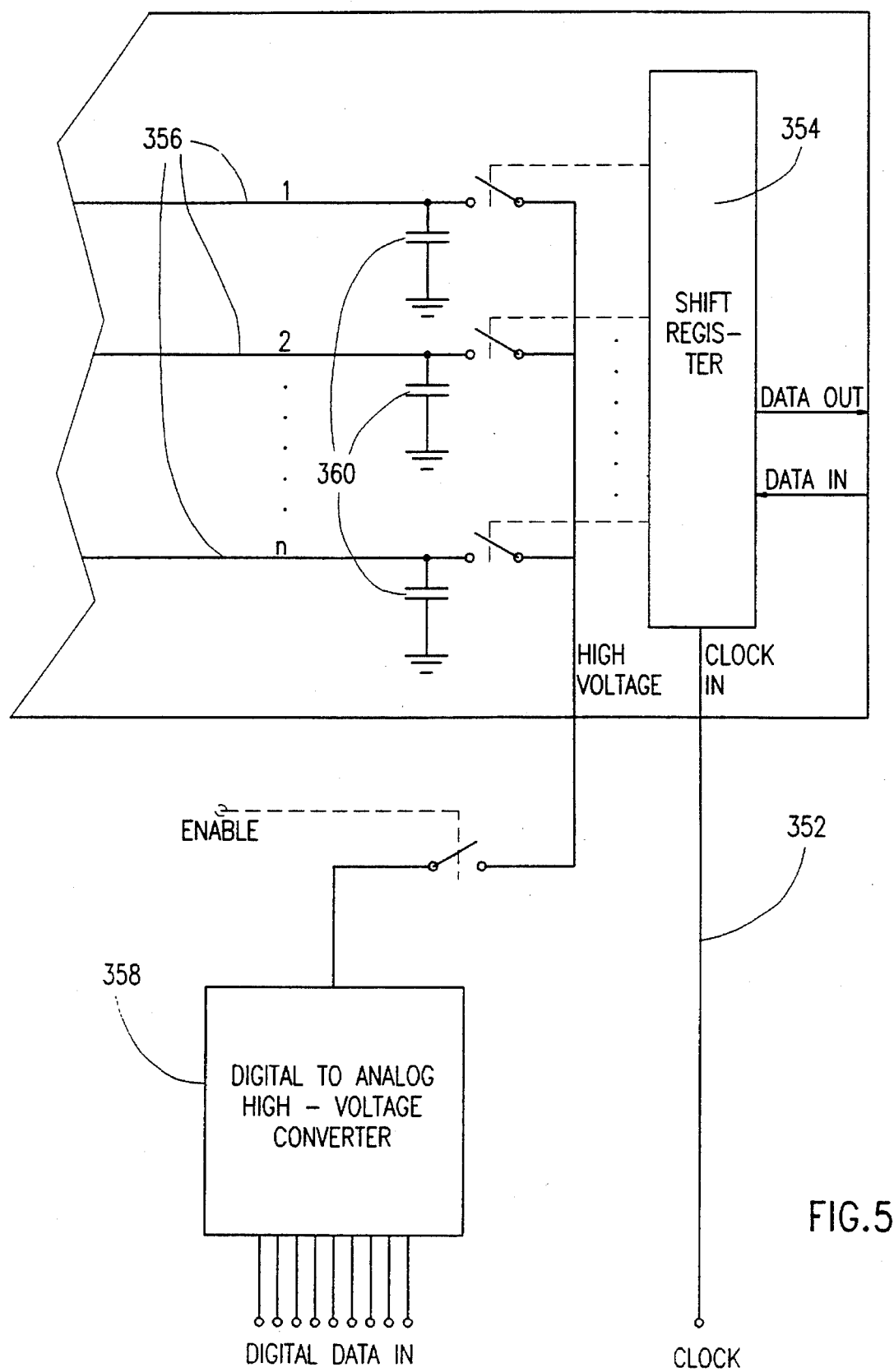
FIG. 5 is a schematic illustration of an alternate embodiment of the apparatus of FIGS. 3A and 3B.

Reference is now made to FIG. 5 which illustrates a schematic representation of an alternate embodiment of the apparatus of FIGS. 3A and 3B for writing continuous as well as half-tone levels.

A clock input 352 is pulsed in coordination with input data causing a shift register 354 to sequentially address each of a plurality of conductive strips 356. The conductive strips 356 may correspond to conductive strips 44 in FIGS. 3A and 3B. The strip being addressed at any given time receives a voltage level from outside electronics 358 and is charged to that voltage level. Typically, outside electronics 358 comprises a digital to analog high voltage converter.

Associated with each strip 356 is a capacitor 360 which retains the given voltage level until the strip is subsequently addressed and receives a new voltage level.

It is appreciated that the write techniques of the present invention allow charges of either polarity to be written to the substrate. It is further appreciated that one individual charge pattern can contain charges of both polarities. The number of voltage levels achievable in accordance with this embodiment is not dependent on the print head. Instead, the number of voltage levels is determined by the outside electronics 358.

Figure 6B:
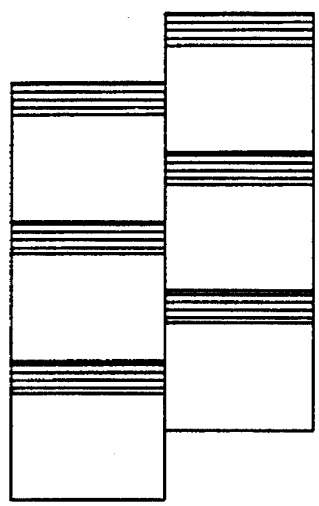
FIGS. 6A, 6B and 6C are illustrations of parameters for obtaining a continuum of gray levels by pseudo half-tones in accordance with an embodiment of the present invention.
Figure 6C:
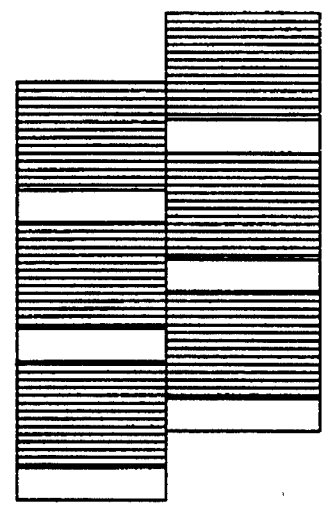
Figure 6A:
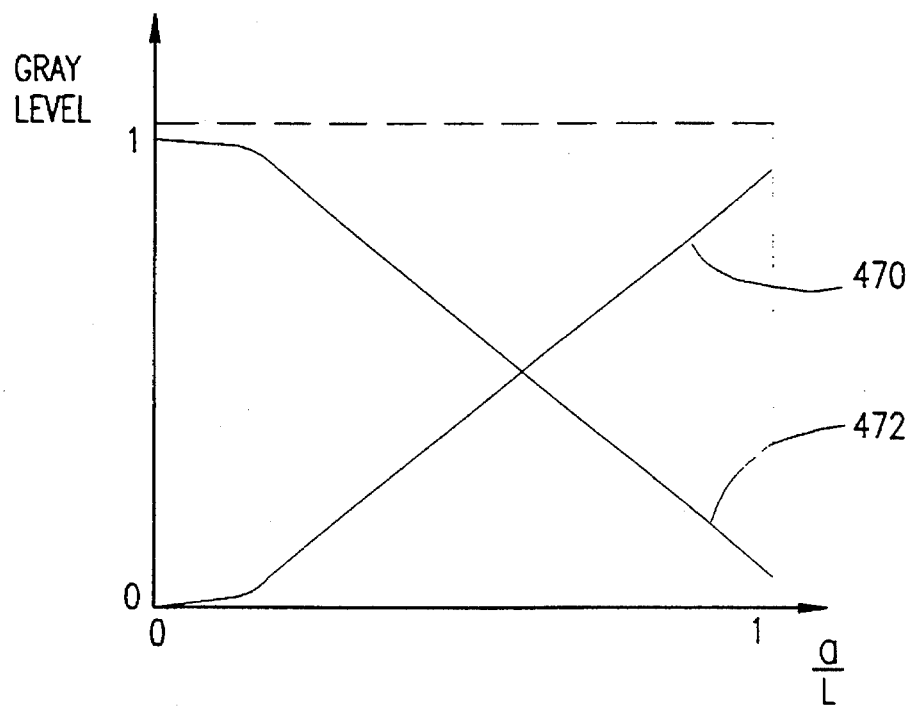

Reference is now made to FIGS. 6A–6C which illustrate a method for obtaining a continuum of monochrome gray levels by providing pseudo-half tones in accordance with an embodiment of the present invention.

FIG. 6A graphically represents monochromatic gray levels that can be achieved over an area as a function of the fractions of each of the pixels comprising that area that are toned. Pixels are charged and toned in accordance with the writing techniques described hereinabove, particularly with reference to FIGS. 3A and 3B, and standard toning techniques.

The dimension of a pixel in the direction of the sweep of the charge source may be represented by L. The dimension of a pixel in the second direction is determined by the width of the conductive strip associated with that pixel. (a/L) is the toning fraction, where a is a function of the velocity of the charge source multiplied by the effective time duration during which the bias voltage on the conductive strip changes during the writing of a single pixel.

Curve 470 illustrates one possible representation of gray levels that can be achieved by controlling the toning fraction of each pixel. In this representation, the voltage biasing the conductive strip is zero at the beginning and end of a sweep of the pixel by a charge source. During the sweep, the voltage biasing the conductive strip is raised to a high level for a time duration determined by the desired toning fraction.

Curve 472 illustrates an alternate representation of gray levels that can be achieved by controlling the toning fraction of each pixel. In this representation, the voltage biasing the conductive strip is at a high level at the beginning and end of a sweep of the pixel by a charge source. During the sweep, the voltage biasing the conductive strip is reduced to zero for a time duration in accordance with the desired toning fraction.

It is appreciated that a continuum of monochrome gray scales may be achieved for an area by selecting the appropriate voltages for the beginning and end of the sweep of each of the pixel locations comprising that area (following curve 470 or curve 472 depending upon the desired grey level).

FIGS. 6B and 6C illustrate close-up views of the fractionally toned image of the pixels of two adjacent conductive strips (not shown) where the pixels of one strip have been phase shifted with respect to the pixels of the second strip.

Two different gray scales are shown (FIG. 6B and FIG. 6C). It is appreciated that the phase shift with respect to adjacent strips enabled by write techniques described hereinabove allows monochrome pseudo half-tone gray scales with high spatial frequency of pixel arrangements to be achieved.

It is further appreciated that continuous color shades can be achieved using color pseudo half-tones. Color pseudo-half tones can be achieved in accordance with the techniques described hereinabove for creating monochromatic pseudo-half tones by varying the toning fraction of a pixel during each of four passes carried out during standard multi-pass subtractive color printing.

It is appreciated that the write techniques described hereinabove, particularly with reference to FIGS. 3A and 3B, provide a method for generating a charge pattern that contains charges of both polarities. It is understood that there exist toners which develop positive charge images and similarly there are other toners which develop negative charge images.

Therefore by using two different color toners which develop opposite polarity charge images, a two-color image may be produced in a single pass. The two-color image may contain any of a continuum of shades of the two colors, in accordance with the techniques for continuous toning described hereinabove, or alternatively, in accordance with the techniques for pseudo halftones described hereinabove. One possible application for this technique is in the generation of "highlight" images.

Figure 7A:
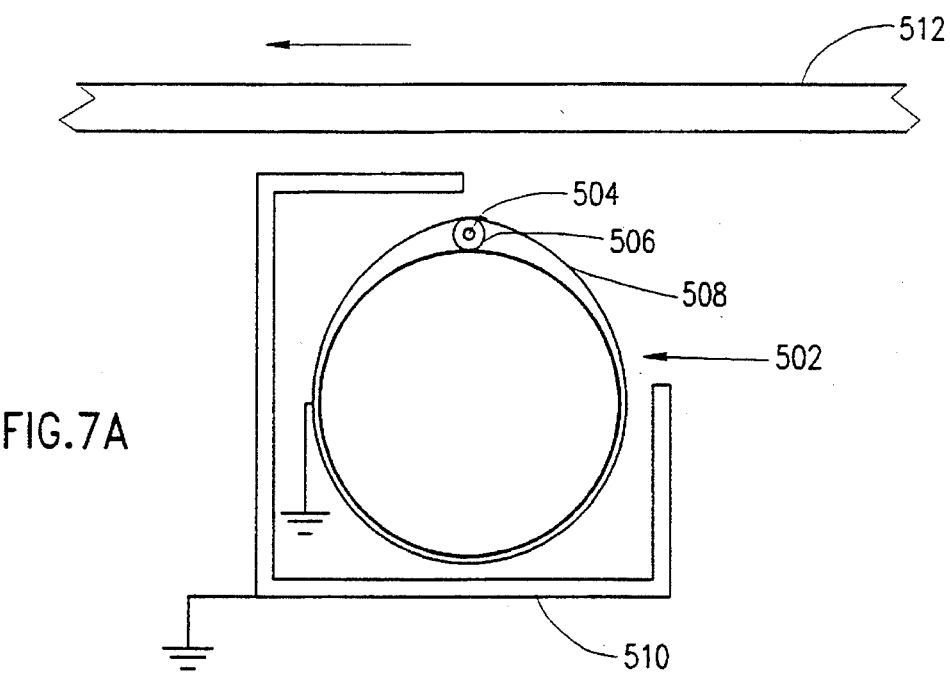
FIGS. 7A and 7B are pictorial illustrations of side and top views, respectively, of an alternative embodiment of an alternating polarity charge source providing a charge flow having at least one defined edge.
Figure 7B:
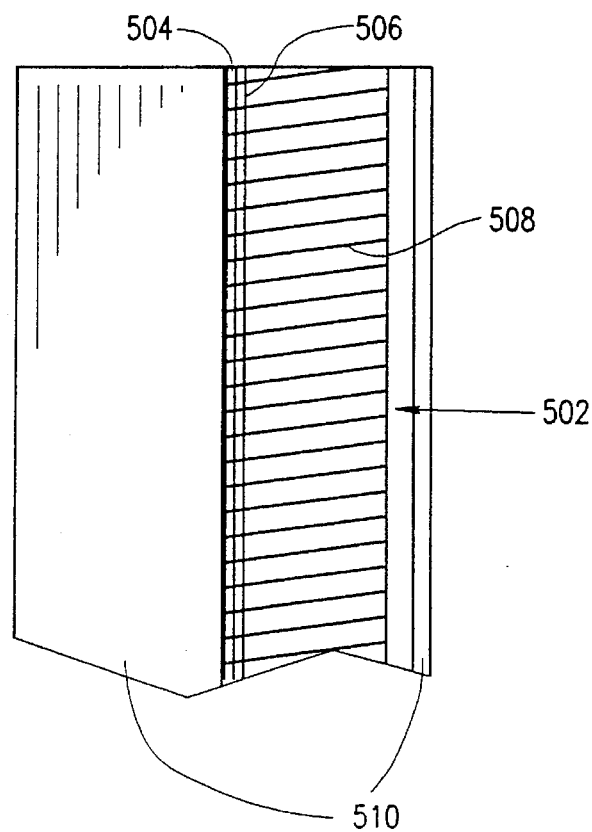

Reference is now made to FIGS. 7A–7B which are pictorial illustrations of side and top views, respectively, of an alternating polarity charge source providing a charge flow having at least one defined edge in accordance with an alternative embodiment of the present invention.

Alternating polarity charge pool apparatus 502 comprises a non-imagewise source of ions. Apparatus 502 may also comprise an elongate conductor 504 coated with a dielectric layer 506 and a transversely oriented conductor 508 contacting or closely spaced from the dielectric-coated conductor as described in U.S. Pat. No. 4,409,604 assigned to Dennison Manufacturing Company of Framingham, Mass., USA.

In accordance with a particular configuration of apparatus 502, conductor 508 is coiled around elongate conductor 504. When apparatus 502 is operational, a pool of positive and negative ions is continuously generated in the air space immediately surrounding the dielectric-coated conductor 504 at the regions in between the locations where the coiled conductor crosses over the dielectric-coated conductor.

An elongate electrostatic shield 510, typically comprising a conductive material, may be configured as illustrated to partially enclose charge pool apparatus 502.

It is appreciated that the charge source of FIGS. 7A and 7B is capable of providing an ion beam with at least one edge sharply defined. It is appreciated that charge pool apparatus 502 alone does not provide an elongate ion beam with a sharply defined edge.

It is further appreciated that apparatus 502 may serve as an elongate alternating polarity charge (EAPCS) source described hereinabove in accordance with write techniques described hereinabove. This configuration is presented to offer an example of possible configurations for the EAPCS and is not intended to be limiting.

It is appreciated that the charge pool apparatus described herein, elongate electrostatic shield 510 is preferably grounded. Alternatively, any suitable shield configuration can be used.

According to an alternative embodiment, an elongate grounded shield generally enclosing charge pool apparatus 502, except for an elongate opening, may be used to provide an ion beam with two defined edges.

Typically, coiled conductor 508 is grounded and elongate conductor 504 continuously receives a high AC voltage typically about 2000 V pp and having a frequency in the range between several hundred kHz to several MHz.

A dielectric surface 512, typically of the type described hereinabove particularly in accordance with FIGS. 3A–3B, sweeps relative to the charge source. Preferably, the gap between dielectric surface 512 and shield 510 is about 100–300 microns. Typically, dielectric surface 512 comprises a plurality of regions each having associated therewith an apparent surface voltage (ASV). During the sweep, these regions of the dielectric surface are brought into their maximum propinquity with the charge pool. The ASV of each region creates an electric field between dielectric substrate 512 and the charge pool.

Electrostatic shield 510 serves to tailor the electric field created. The ASV at regions on the dielectric substrate which have direct unshielded access to the charge pool causes ions of the appropriate polarity to be extracted until the ASV at that region is neutralized. The ASV at regions on dielectric substrate 512 which are shielded from the charge pool are not involved in ion extraction. When a region on the dielectric surface is in a location which is not shielded from the charge pool, the region may accumulate charges in accordance with the techniques described hereinabove. When the region is moved to a shielded location, additional charge will not accumulate on that region.

It is appreciated that the extracted ions typically form a beam with at least one sharply defined edge. In accordance with the techniques described in accordance with this embodiment of the invention, preconditioning of the dielectric surface to be charged is not necessary. Therefore, the width of the charge beam is not significant as long as one edge is sharply defined. It is also appreciated that charges from the opposite, undefined edge of the ion beam do not affect the final amount of charge that are accumulated at a region. When the region moves past the sharply defined edge, the appropriate amount of negative or positive charges is deposited to balance the effect of the conductive backing potential regardless of any stray charges that may have accumulated at that region from the opposite, undefined edge. The edge resolution achievable in the direction of the sweep may be a function of the intensity of the ion beam and the sharpness of the beam edge.

It is additionally appreciated that although the charge flow may be amplitude modulated as illustrated in FIG. 1D, such amplitude modulation may not be required for the embodiments of FIGS. 7A–10B.

Figure 8:
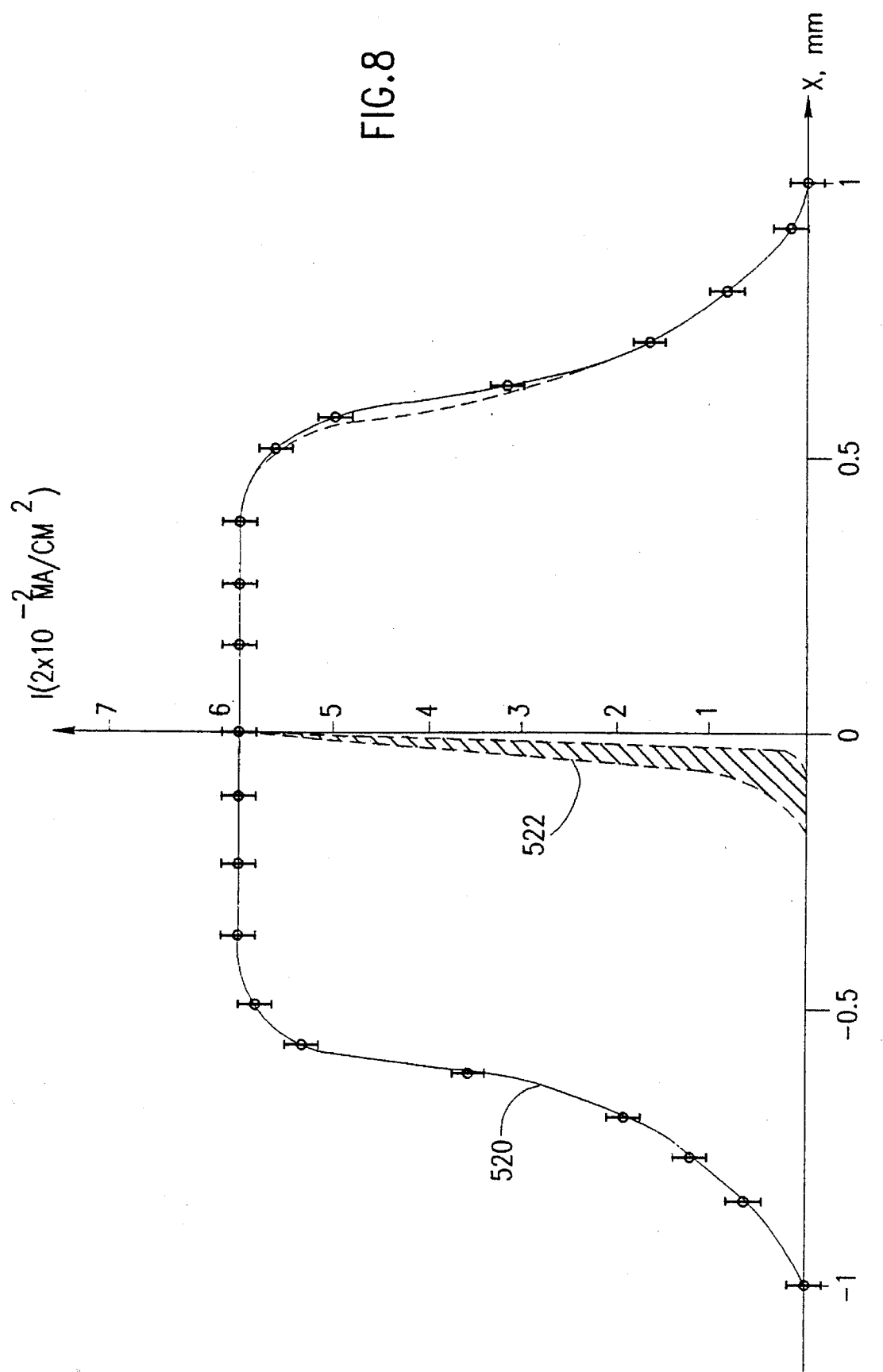
FIG. 8 is a graphical illustration of the intensity of an ion current measured by a current measuring device as a function of the relative displacement in a sweep direction between an alternating polarity charge source and the device in accordance with a preferred embodiment of the present invention.

Reference is now made to FIG. 8 which is a graphical illustration of the intensity of an ion current measured by a current measuring device as a function of the relative displacement in a sweep direction between an alternating polarity charge source and the device in accordance with a preferred embodiment of the present invention;

For the measurements illustrated herein, a conductive current probe with a constant bias voltage of 400 V (providing an ASV of 400 V) was used to monitor the steady-state ion beam.

Curve 520 illustrates a typical ion beam profile for the case where apparatus 502 (FIGS. 7A and 7B above) does not comprise an electrostatic shield.

Curve 522 illustrates a typical ion beam profile for the case where apparatus 502 (FIGS. 7A and 7B above) comprises an electrostatic shield, typically of the type described hereinabove and indicated by reference number 510.

The two sets of measurements were carried out under the same conditions. In particular, the distance between the probe and the charge pool remained unchanged. Curve 522 illustrates the region in which the beam has a sharp edge. The shaded area represents the uncertainty of the measurement due to the accuracy of the measuring device. The edge of the ion beam (illustrated by curve 522) using the shield apparatus is sharply defined. By contrast the edge of the ion beam (illustrated by curve 520) in the non-shielded apparatus is not sharply defined.

It is appreciated that curves 520 and 522 illustrate ion beams under static conditions where the ASV does not change. Under dynamic conditions, when the ASV changes with time, the ion beam of the unshielded apparatus may exhibit a high degree of blooming. It is appreciated that under the same dynamic conditions, the ion beam of the shielded apparatus will not exhibit such blooming.

Figure 9A:
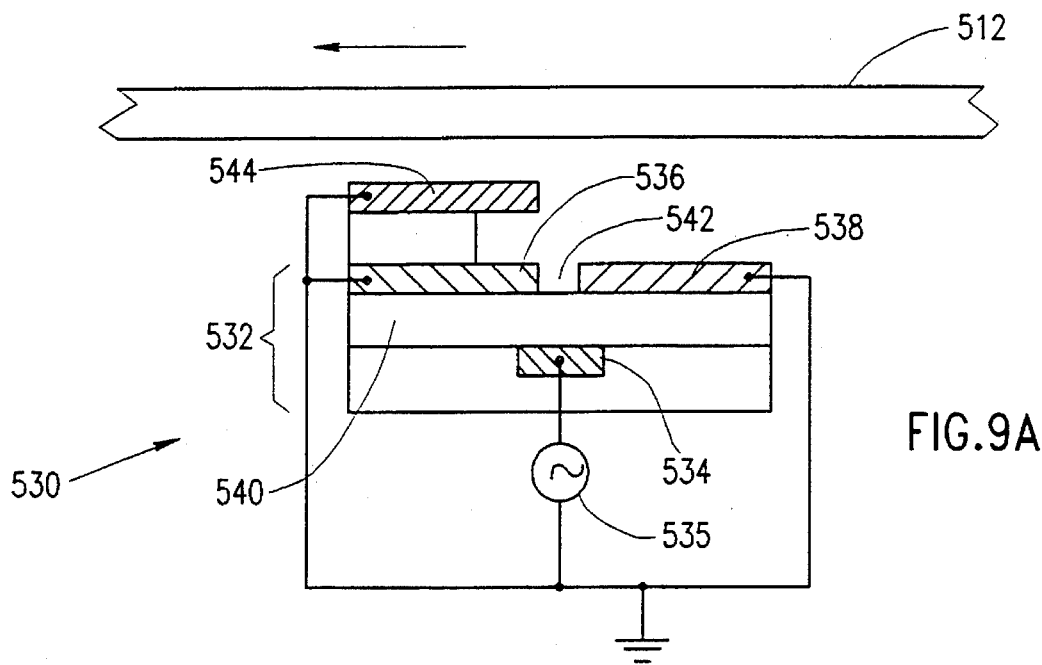
FIGS. 9A and 9B are pictorial side and top view illustrations respectively, of a further alternating polarity charge source providing a charge flow having at least one defined edge.
Figure 9B:
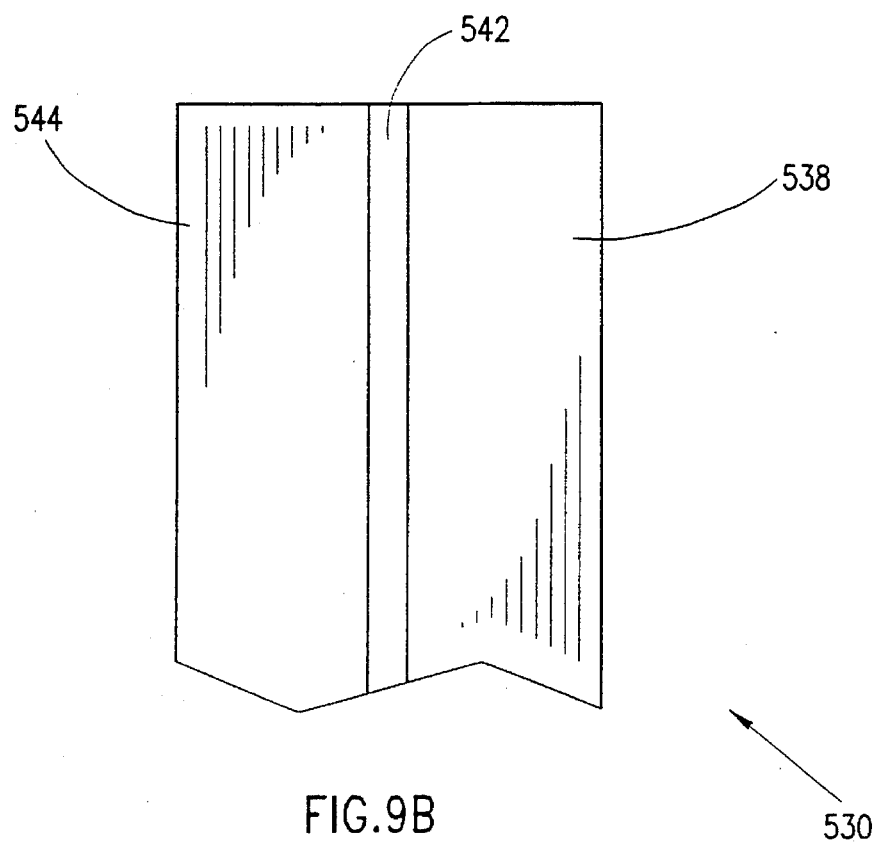

Reference is now made to FIGS. 9A–9B which are pictorial respective side and top view illustrations of apparatus 530 for providing an alternating polarity charge beam having at least one defined edge.

Apparatus 530 comprises alternating polarity charge pool apparatus 532 which includes a non-imagewise source of ions, comprising a high voltage electrode 534 coupled to a high voltage AC source 535 and two grounded electrodes 536 and 538. Grounded electrodes 536 and 538 are separated from high voltage electrode 534 by a dielectric layer 540. A space 542 is defined between grounded electrodes 536 and 538, providing a slot in which an ion pool may be generated. Alternatively electrodes 536 and 538 may be replaced by a single slotted electrode. The electrode arrangement may be as described in U.S. Pat. No. 4,155,093 assigned to Dennison Manufacturing Company of Framingham, Mass., USA.

It is appreciated that ion pool apparatus 532 does not itself provide an elongate ion beam with a sharply defined edge.

In order to achieve an ion beam which has at least one edge defined in accordance with the techniques described hereinabove particularly with respect to FIGS. 7A–7B, apparatus 530 further comprises an elongate electrostatic shield 544. Shield 544 typically comprising a preferably grounded conductive material is located with some spacing relative to charge pool apparatus 532. Electrostatic shield 544 may be configured as illustrated whereby charge pool apparatus 532 is partially obscured by shield 544.

It is appreciated that apparatus 530 may serve as an elongate alternating polarity charge source in the write techniques described hereinabove. It is noted that the configuration presented here is a further example of a possible configuration for the charge source and is not intended to be limiting.

It is appreciated that use of an electrostatic shield as described hereinabove may possibly provide benefits in addition to providing a shielding function. One such benefit is a further shaping of the electric field generated by the conductive strips (FIGS. 3A and 3B) at the surface of the dielectric substrate directly opposite the shield. This may provide more highly uniform charging of the dielectric substrate in regions where adjacent strips are at the same potential.

Figure 10A:
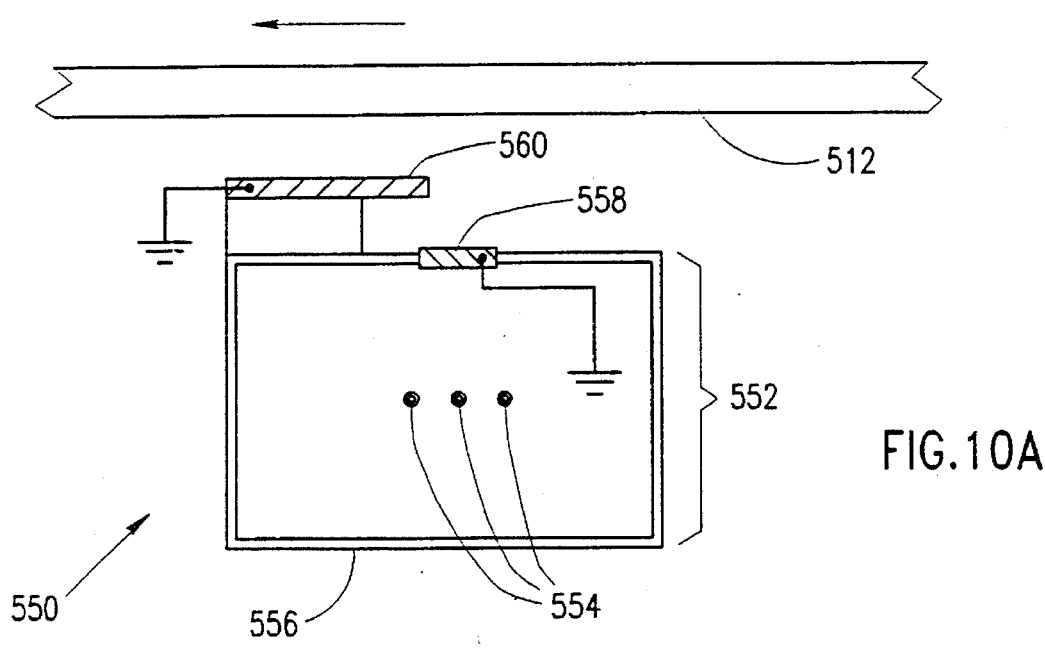
FIGS. 10A and 10B are pictorial side and top illustrations of an alternative embodiment of an alternating polarity charge source providing a charge flow having at least one defined edge in accordance with the present invention.
Figure 10B:
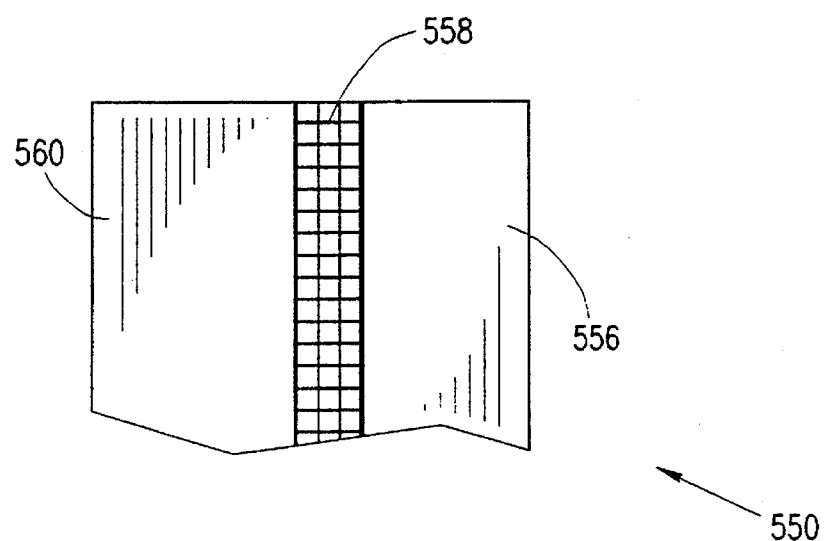

Reference is now made to FIGS. 10A and 10B which are pictorial illustrations of apparatus 550 for providing an alternating polarity charge beam having at least one defined edge.

Apparatus 550 comprises alternating charge pool generating apparatus 552, a casing 556 and an elongate electrostatic shield 560. Apparatus 552 preferably comprises one or more corona wires 554 some or all of which may be dielectrically coated. Alternatively, corona wires 554 may not be dielectrically coated. Each corona wire 554 is operative to receive a high AC voltage. All of the wires 554 may be biased by the same AC source (not shown). Alternatively, corona wires 554 may be biased by AC sources having different amplitudes. Each corona wire 554 may receive a different AC voltage.

Corona wires 554 are confined by an isolating casing 556, typically formed of a dielectric material. Casing 556 typically contains an elongate grounded section 558 which is partially open and wherein an ion pool is created.

The open area of grounded section 558 may comprise a gridlike area as shown. Alternatively, the open area may comprise at least one elongate slot.

According to an alternate embodiment of apparatus 552, casing 556 may further comprise an inlet through which conditioned air may flow onto corona wires 554. In this embodiment, the intensity of the ion pool created at section 558 may be increased.

In order to achieve an ion beam which has at least one edge as described hereinabove particularly with reference to FIGS. 7A–7B, elongate electrostatic shield 560 typically comprising a grounded conductive material, is spaced relative to charge pool apparatus 552. Electrostatic shield 560 may be configured as illustrated so that charge pool apparatus 552 is partially obscured.

It is appreciated that apparatus 550 may serve as an elongate alternating polarity charge (EAPCS) source described hereinabove in accordance with the write techniques described hereinabove. This configuration is an example of a possible configuration for the EAPCS and is not intended to be limiting.

Reference is now made to FIGS. 11A–11C which illustrate a system for writing and developing electrostatic images in accordance with another embodiment of the present invention. The illustrated embodiment employs a drum 700 having a dielectric layer 702 on its outer surface, which is rotated in a direction indicated by arrow 704.

A plurality of conducting electrodes (not shown) are embedded in the dielectric layer 702 and extend over the periphery of the outer surface of the drum. Electronic circuitry 706 may be mounted interiorly of the outer surface of the drum and of layer 702, whereby each electrode may be connected to a driver forming part of the circuitry 706.

Associated with drum 700 and more particularly with dielectric layer 702 is a charge source 708, preferably of the type shown in any of FIGS. 7A–10B. A magnetic brush developer unit 710 and a cleaning unit 716 are operatively associated with drum 700 in a conventional manner.

The apparatus of FIGS. 11A–11C is particularly characterized in that charge image generation and developing may take place simultaneously at different regions of the drum. This is achieved by operating the charge source 708 discontinuously, in a series of bursts, as indicated in FIG. 11B.

During each burst of the operation of charge source 708, all of the electrodes embedded in dielectric layer 702 receive appropriate voltages representing a single raster line of an image to be printed. Immediately following operation of the charge source 708, i.e. in between the bursts shown in FIGS. 11B, the drivers in circuitry 706 supply to each such electrode a voltage which is equal and opposite to the voltage applied thereto during the operation of charge source 708.

FIGS. 11C shows the voltage on a given electrode both during the bursts of operation of the charge source 708 and in between the bursts, in response to operation of the drivers in circuitry 706.

The result of these operations is that in each electrode, an electrical signal is generated which is composed of high Fourier frequency components and a zero DC component. The elimination of the DC component eliminates spurious operation of the magnetic brush developer unit 710 which would otherwise occur. It is further noted that when the developer unit 710 employs dual-component toners the high Fourier frequency components in the signal also do not result in spurious toner deposition by the developer unit 710.

In this way, the signals present on the electrodes during development by developer unit 710 do not interfere with the desired development of the latent image on the dielectric layer 702, but operate only for desired latent image generation.

The toned image produced by developer unit 710 is transferred to an output substrate, typically paper, by a transfer unit 712 and fixed to the output substrate by a fixing unit 714 using standard toner fixing techniques. Any residual toner on the outer surface of the drum 700 is removed by the cleaning unit 716 using standard techniques.

Figure 12A:
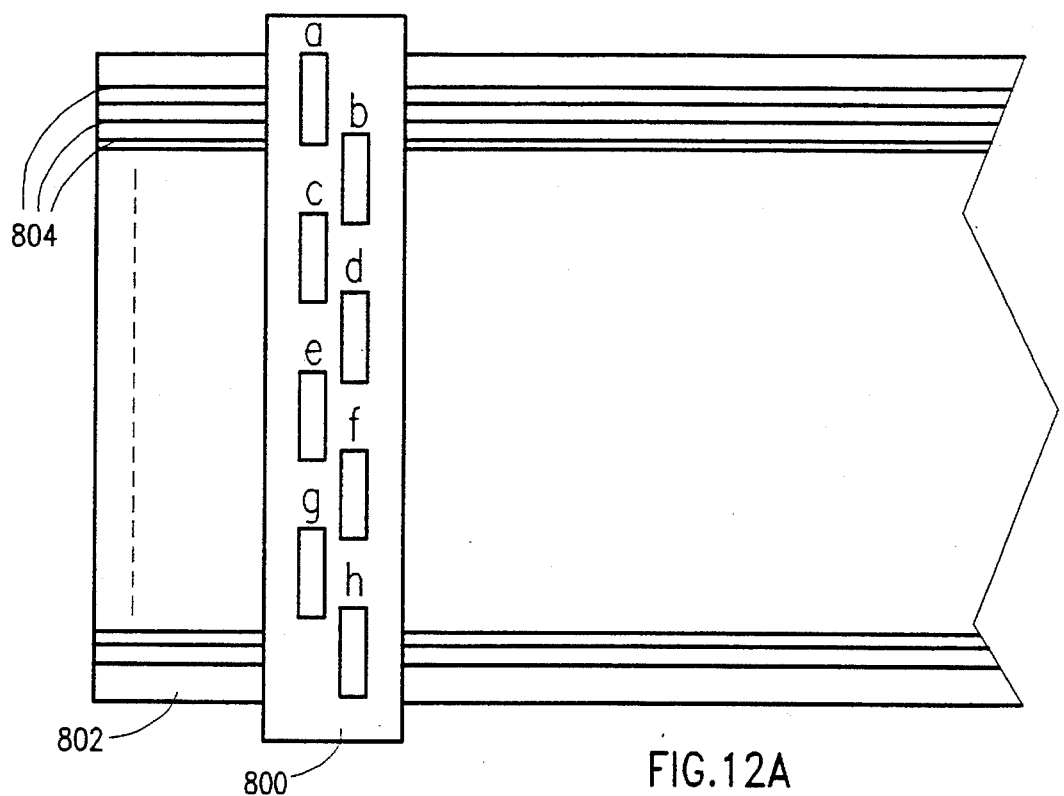
FIG. 12A is a simplified illustration of printing apparatus constructed and operative in accordance with another preferred embodiment of the present invention.
Figure 12B:
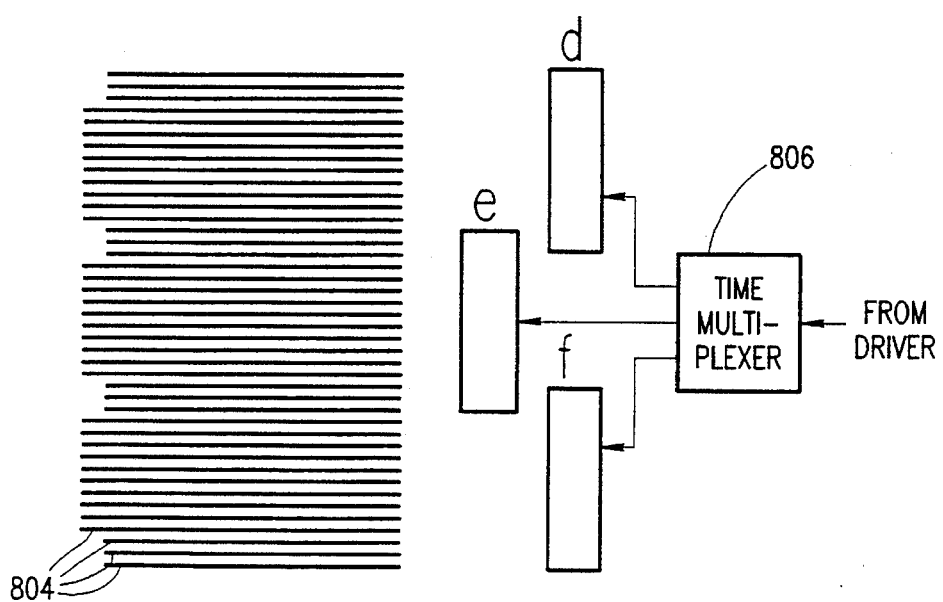
FIG. 12B is an illustration of the operation of the apparatus of FIG. 12A.

Reference is now made to FIGS. 12A and 12B which illustrate a system for writing and developing electrostatic images in accordance with yet another embodiment of the present invention. The illustrated embodiment employs time multiplexing of the output of a limited number of drivers to a plurality of different arrays of individual charge sources, such as shown in FIGS. 3A and 3B.

As seen in FIGS. 12A and 12B, a charge source array assembly 800 includes a plurality of individual charge sources, which are indicated by the letters a–h and are seen to be arranged in staggered, mutually partially overlapping relationship with a substrate 802 bearing a plurality of electrodes 804. The individual charge sources receive signal inputs from a time multiplexer 806 which in turn receives signal inputs from drivers (not shown). The individual charge sources a–h may be of the type illustrated in any of FIGS. 7A–10B.

Figure 13A:
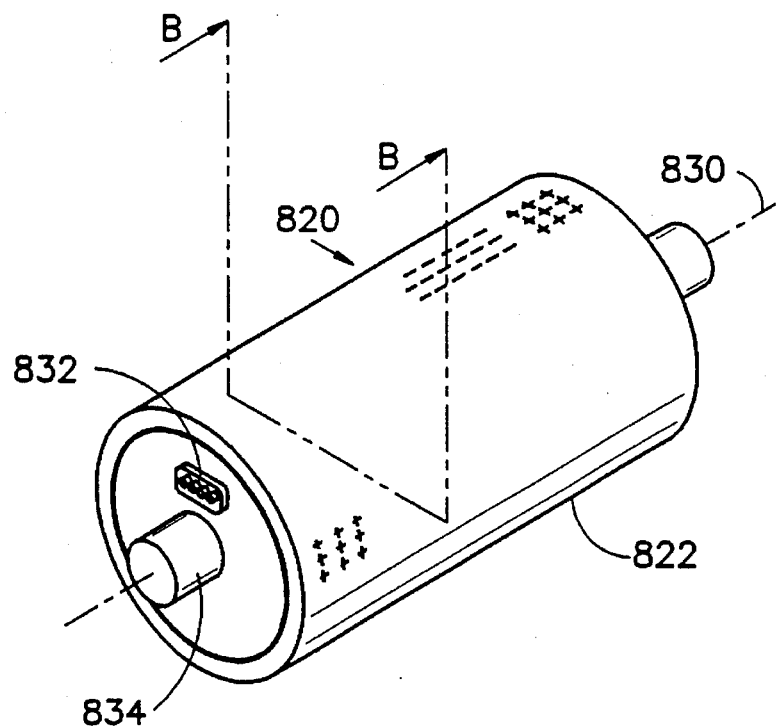
FIG. 13A is a generalized pictorial illustration of an electrostatic imaging drum constructed and operative in accordance with a preferred embodiment of the present invention.
Figure 13B:
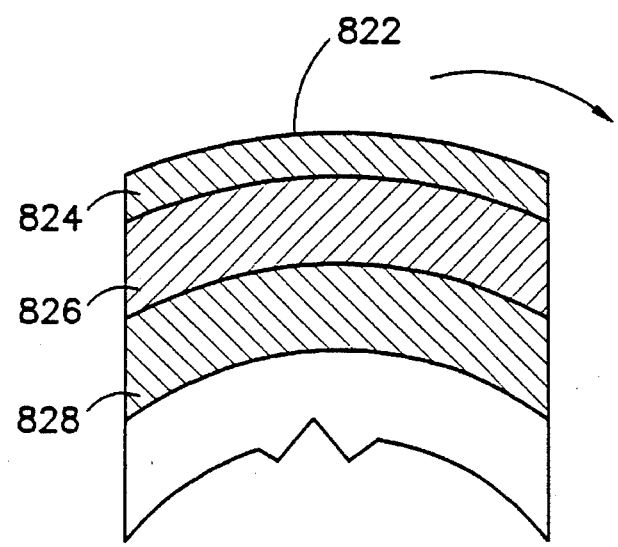
FIG. 13B is a sectional illustration of a portion of the drum of FIG. 13A, taken at line B—B on FIG. 13 A.

Reference is now made to FIGS. 13A and 13B which illustrate an electrostatic imaging drum suitable for use in a variety of imaging applications including those described hereinabove as well as those described in the copending applications referred to hereinabove, the description of which is hereby incorporated by reference.

FIG. 13A shows a drum 820 on whose outer surface 822 latent electrostatic images are generated in accordance with the image writing techniques described hereinabove and hereinbelow.

The outer surface 822 includes portions which are imaging regions and other portions which are not imaging regions. Images are created at the imaging regions using an edge-defined alternating polarity charge source (not shown), and signals supplied to a conductive backing forming part of the drum. The charge source may be any suitable one of the charge sources described hereinabove, and particularly those illustrated in any of FIGS. 7A–10B. The conductive backing preferably comprises a plurality of electrodes.

FIG. 13B shows a cross section of an imaging region of the drum. The drum comprises an outer dielectric imaging layer 824 which may extend over both the imaging regions and the non-imaging regions. At imaging regions, a conductive backing 826 is associated with the outer dielectric imaging layer 824. The conductive backing overlies an inner dielectric layer 828. Electronic circuitry including drivers (not shown) is associated with the electrodes of the conductive backing 826.

The outer dielectric imaging layer 824 can be made of any material that is suitable for use with the conductive backing 826. A suitable material may include dielectric polymeric-based materials, such as polyethylene terephthalate (PET, PETP) or polyamides. Alternatively inorganic materials, such as glass or ceramics (alumina, sapphire, etc.) may be used.

The conductive backing 826 preferably comprises densely spaced thin conductive electrodes. The density of the electrodes, the transverse cross-sectional geometry thereof and the thickness of the outer dielectric imaging layer 824 determine the spatial resolution of the latent image in the axial direction parallel to the longitudinal axis 830 of the drum 820.

Contained within the drum 820 are imaging electronics which preferably includes serial to parallel data transfer electronics and high voltage strip drivers. External data representing the latent image to be generated may be supplied to the imaging electronics through one or several connectors 832. It is appreciated that connectors 832 may be located additionally or alternatively on the faces of the drum or on a drum axle 834.

Alternatively or additionally, data connections between the rotating drum and the stationary data source may be effected using slip rings, which may include mechanical, optical and conductive liquid based elements. Alternatively in accordance with certain configurations, where the drum does not complete full rotations, information may be transferred through a flexible cable.

The length of the drum along axis 830 may be any desired length and is typically selected to conform to standard print formats, for example, standard A and B formats.

The printing properties of the drum, its durability, the speed of operation, the toning materials, the operating voltages and the print cycle are determined in part by the materials used in building the drum. For example, drums with an outer dielectric glass or ceramic imaging surface are expected to provide enhanced durability.

Reference is now made to FIGS. 14A–14D which illustrate four alternative arrangements of imaging regions on the cylindrical surface of drum 820.

Figure 14A:
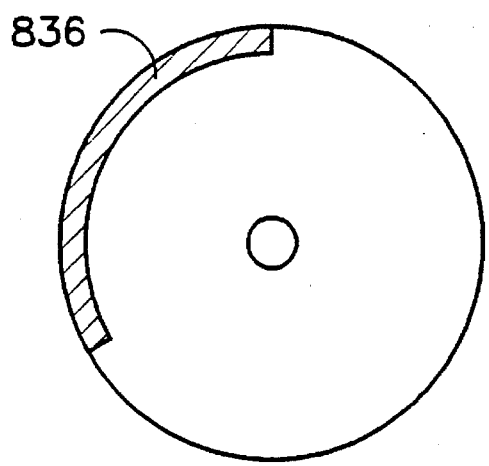
FIGS. 14A, 14B, 14C and 14D are sectional illustrations, taken along line B of FIG. 13A, of four alternative embodiments of the drum of FIG. 13A.

As noted above, the surface of drum 820 comprises one or more imaging regions with the remaining surface of the drum not being active in the imaging process. The size of the nonactive surface area is selected to achieve the desired drum diameter in accordance with a desired print cycle and print engine configuration. The division between imaging and non-imaging regions thus depends on the printing cycle, printing speed and other characteristics of a given printing engine. Possible configurations include, for example:

1. A single imaging region extends across less than half of the drum surface. One printing cycle is carried out per complete drum rotation. In this case, the drum typically continuously rotates in a single direction. This embodiment is shown in FIG. 14A where the conductive backing is indicated by reference numeral 836.

Figure 14B:
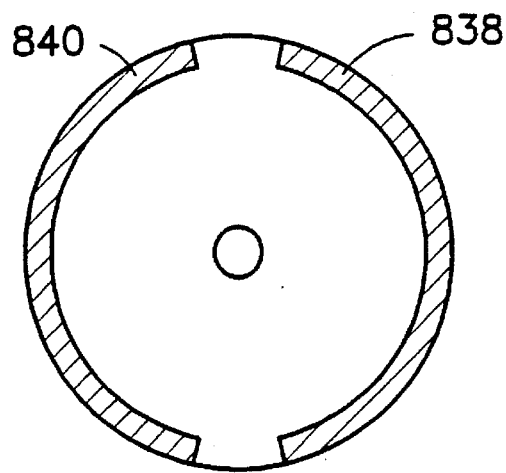

2. Two distinct independent imaging regions are separated by non-imaging regions. Two printing cycles are carried out per complete drum rotation, one cycle for each imaging region. In this case, the drum typically continuously rotates in a single direction. This embodiment is shown in FIG. 14B where the conductive backing portions are indicated by reference numerals 838 and 840.

Figure 14D:
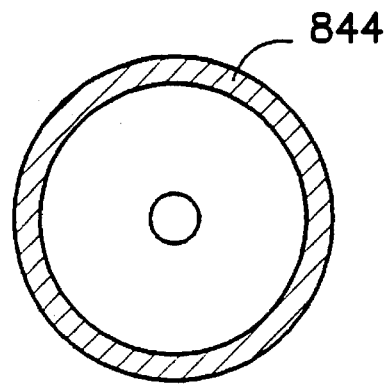
Figure 14C:
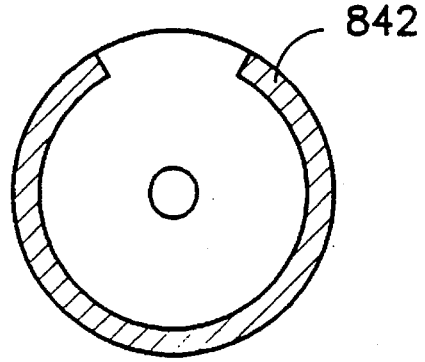

3. A single imaging region extends across most or all of the drum surface. Each printing cycle is accomplished by several rotations of the drum. In this case, the drum typically continuously rotates in a single direction. Alternatively, a printing cycle may be carried out by a combination of clockwise and counterclockwise rotations of the drum. These embodiments are shown in FIGS. 14C and 14D, where the conductive backing portions are indicated by reference numerals 842 and 844.

Typically, the imaging regions and non-imaging regions have similar external appearance. Alternatively, the regions may be externally distinguishable.

Figure 15A:
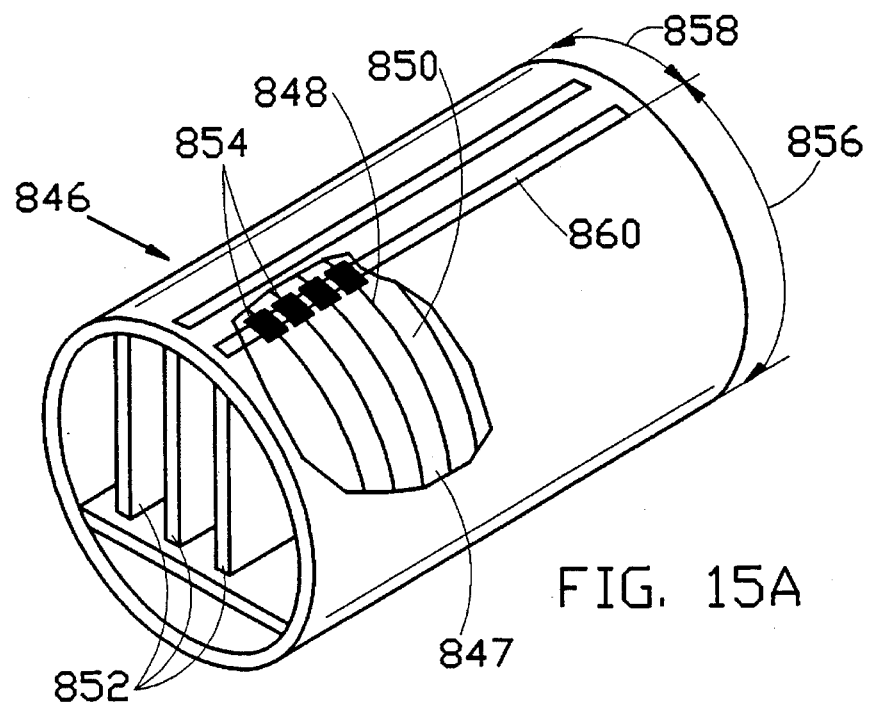
FIG. 15A is a partially cut away generalized pictorial illustration of a preferred embodiment of the drum of FIGS. 13A and 14C.

Reference is now made to FIGS. 15A–15E which illustrate preferred interior structures for drum 820. Referring first to FIG. 15A, it is seen that the drum, indicated by reference numeral 846, comprises a conductive backing 847 comprising closely spaced electrodes 848 embedded in a dielectric substrate 850, imaging electronics located on primary printed circuit boards 852 located interior of the drum and connectors 854 connecting the electrodes 848 to the printed circuit boards 852. The electrodes 848 and connectors 854 are shown in FIG. 15A with exaggerated dimensions and spacing. In reality, each electrode has a width of approximately 20–40 microns and the electrodes are separated from one another by a spacing of approximately 15–20 microns. The connectors 854 are typically pads formed by printed circuit techniques. In reality, the width of each connector 854 is typically on the order of 100 microns and the gap between connectors is also typically on the order of 100 microns.

The dielectric substrate 850 having electrodes 848 embedded therein may be fabricated by any suitable technique including, for example, techniques mentioned hereinabove.

Two general methods for producing the conductive backing 847 of the imaging region of the drum are described hereinbelow with reference to FIGS. 15C and 15D.

Drum 846 comprises an imaging region 856 which extends across most of the drum surface and a non-imaging region 858. Non-imaging region 858 covers the connectors 854 which connect conductive electrodes 848 to primary printed circuit boards 852. Each primary printed circuit board 852 contains a single line array of connectors 854.

Typically, primary printed circuit boards 852 are shaped to fit inside drum 846. The line array of connectors 854 of each printed circuit board 852 is positioned for exposure through a narrow slot 860 in the drum surface, which slot extends parallel to the longitudinal axis of drum 846. The number of slots 860 corresponds to the number of primary printed circuit boards 852.

Imaging electronics, including digital serial-to-parallel data transfer and high-voltage electrode drivers, may be located on a non-connector section of printed circuit board 852. The non-connector section of primary printed circuit boards 852 may be flexible or rigid depending on the drum structure and diameter.

Figure 15B:
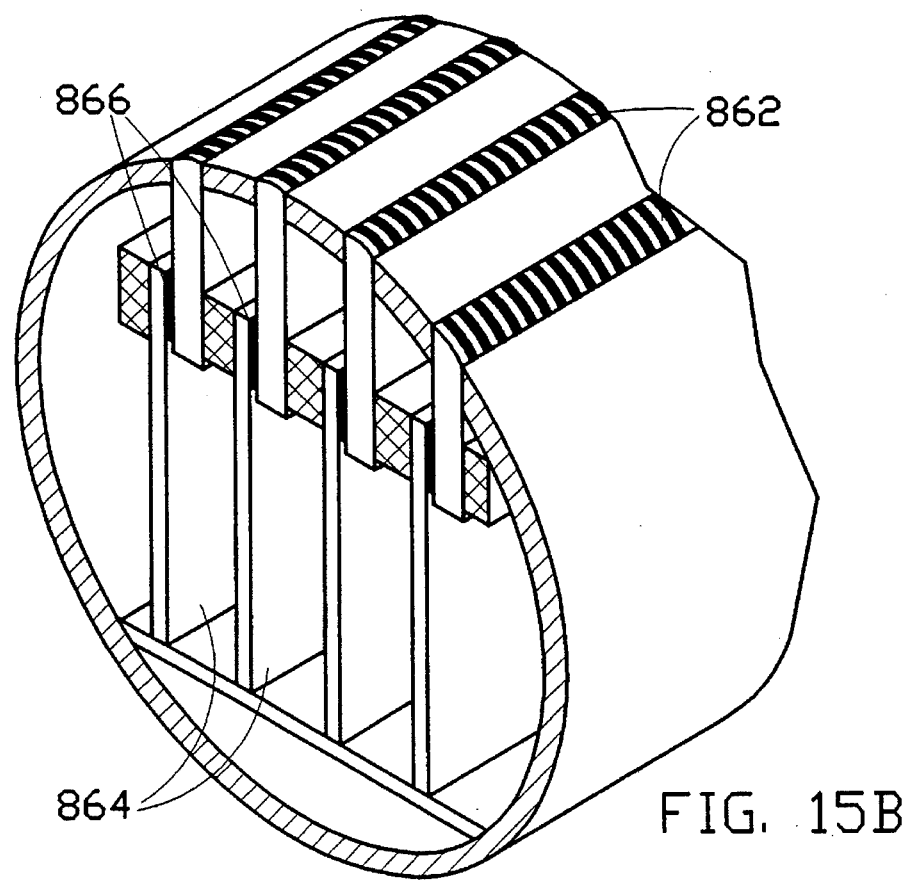
FIG. 15B is a partially sectional, partially pictorial illustration of a further variation of the drum of FIGS. 13A and 14C.

Reference is now made particularly to FIG. 15B which shows an alternative inner configuration of drum 846. In this configuration, two sets of parallel printed circuit boards are used, a primary set 862 and a secondary set 864. Each printed circuit board in primary set 862 is connected to a plurality of conductive electrodes 848 (FIG. 15A) by means of a single line array of connectors. Preferably, the primary set of printed circuit boards 862 does not contain any electronic components. Instead, they serve only as an interconnection between conductive electrodes 848 and the secondary set of printed circuit boards 864.

Alternatively, a pre-formed rigid base, comprising any suitable dielectric material (for example ceramic, glass, anodized aluminum, etc.) with a surface pattern created using a conductive material (for example copper, gold, etc.) may be used in place of the primary set of printed circuit boards 862.

The secondary set of printed circuit boards 864, which may be made of flexible or rigid material, comprise imaging circuitry and a set of connectors. The number and layout of connectors on the secondary set of printed circuit boards 864 corresponds to that on the primary set 862.

Electrical connection in registration between the connectors of the printed circuit boards of the primary set 862 and of the secondary set 864 may be effected using elastomeric high density contact arrays (zebra connectors) 866. Typically, contact between the two sets of connectors is carried out through application of pressure.

It is appreciated that in accordance with this configuration, printed circuit boards of the secondary set 864 are removable from drum 846 by releasing the pressure on the elastomeric high density contact arrays. Thus, the surface of drum 846 may be replaced without requiring replacement of the secondary set 864 of printed circuit boards or of the imaging electronics formed thereon.

Figure 15C:
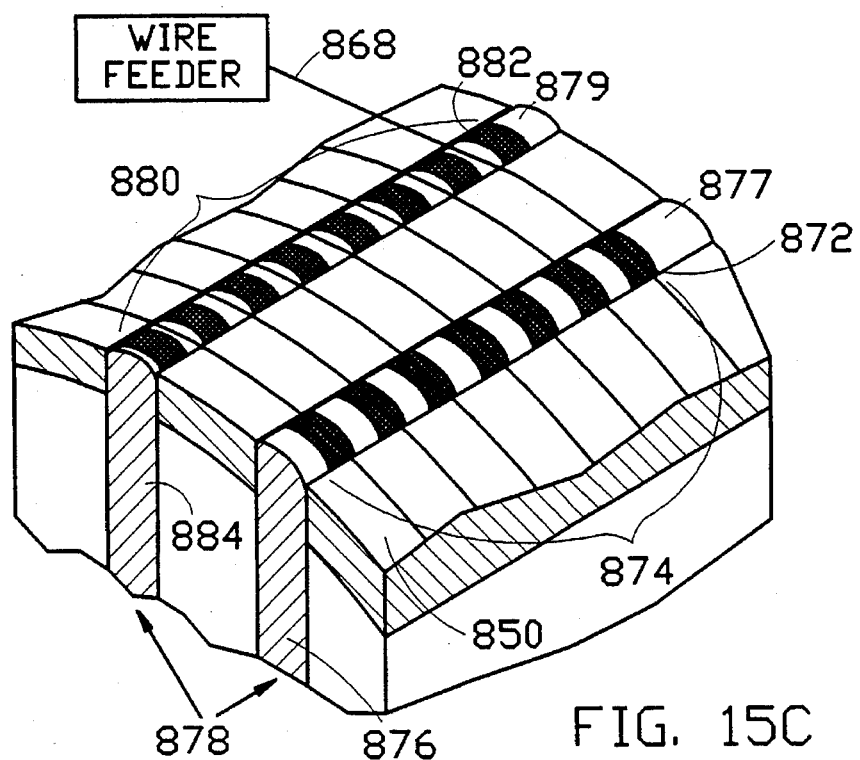
FIG. 15C is an enlarged illustration of a portion of the drum of FIG. 15A, at an intermediate stage of drum fabrication.

Reference is now made to FIG. 15C which illustrates conductive electrodes 848 of drum 846 at an intermediate stage of fabrication.

A conductive wire 868 is tightly wrapped around an inner dielectric surface 850 of drum 846 resulting in a coiling of the wire into spacewound turns about surface 850 with a very precise pitch. Prior to wrapping the wires, a thin adhesive layer (not shown) may be adhered to the inner dielectric surface 870 of the drum 846 to ensure proper alignment and spacing of the wires.

The wires should exhibit sufficiently high electrical conductivity combined with mechanical strength so as not to tear during the winding process. The wires may be made of stainless steel, copper alloys, tungsten, etc. and may be uncoated. Alternatively, the wires may be coated with an insulating material such as glass or alternatively with a polymeric coating such as polyurethane, polyamide, etc. The actual material for the wire and for its coating are selected to best suit the fabrication process, the desired properties of the printing device and other materials used in production.

The pitch of the coil is selected to match the spacing of connectors 872 of the first primary printed circuit board 876 which is located in a slot 877. The wire is coiled until each connector 872 is located in contact with an individual turn of the wire. Primary printed circuit boards 878 may be of the type described above in conjunction with FIG. 15A or FIG. 15B.

After the wire is wound substantially across the entire surface 850, the wire is bonded to connectors 872. Bonding may be accomplished by parallel gap bonding techniques. Alternatively, bonding may be carried out by employing reflow wire soldering techniques using hot rams, or non-contact hot air jets. Where necessary, the insulating coating may be stripped off the segments of the wire that are located in the connector region, during or after the winding process. For wires with a solderable coating, stripping may be carried out during the soldering process. Additionally, or alternatively any other suitable bonding technique may be used.

In accordance with a further embodiment of the invention, connectors 872 of the primary printed circuit boards 876 may be precoated with a predetermined amount of soldering material per connector. This method facilitates the bonding process for fine-pitch soldering.

After the wire has been bonded to all the corresponding connectors in a single line array 874, a thin layer of dielectric material is spread across the line array 874 of connectors 872 to electrically insulate them from each other.

The wire coil is then cut parallel to the drum axis adjacent both sides of an adjacent slot 879. The cuts disconnect from each other adjacent portions of the coil in electrical contact with adjacent connectors of a given line array 874. The result is an array of precisely spaced mutually electrically-insulated conductive wires each of which is separately connected to a separate connector forming part of array 874. These wires constitute some of the electrodes of the present invention. Additionally, the cuts remove those portions of wire which would otherwise extend over an adjacent line array 880 of connectors 882 of an adjacent primary printed circuit board 884.

After the above steps have been completed on the first primary printed circuit board 876, they are repeated for every primary printed circuit board 878 using a different wire for each primary printed circuit board and continuing until each connector on each primary printed circuit board is in electrical contact with a wire. The spacing between connectors in each single line array on each primary printed circuit board is constant. However, the first connector and thus all subsequent connectors in the line array on each primary circuit board are shifted along an axis parallel to the longitudinal axis of the drum slightly relative to the connectors of each adjacent primary printed circuit board.

The number of connectors used, which determines the pitch of the winding, can be varied to achieve different spatial resolutions along the drum axis direction. Using several primary printed circuit boards and several sequential corresponding winding steps enables high spatial resolution of the conductive electrodes to be realized while enabling relatively lower resolution to be employed for the connectors, which resolutions are better suited to printed circuit board manufacturing and bonding processes. Alternatively, when lower resolutions are required, or when otherwise desirable, a single primary printed circuit board can be used.

Densities greater than 600 lines (wires) per linear inch can be achieved using this technique, as can be appreciated by a consideration of the examples shown in FIGS. 15A, 15B and 15C, where four primary printed circuit boards and 1500 connectors are employed in association with each primary printed circuit board.

Alternatively, the conductive backing 847 of drum 846 may be prepared by other techniques which allow the creation of densely packed conductive electrodes.

Figure 15D:
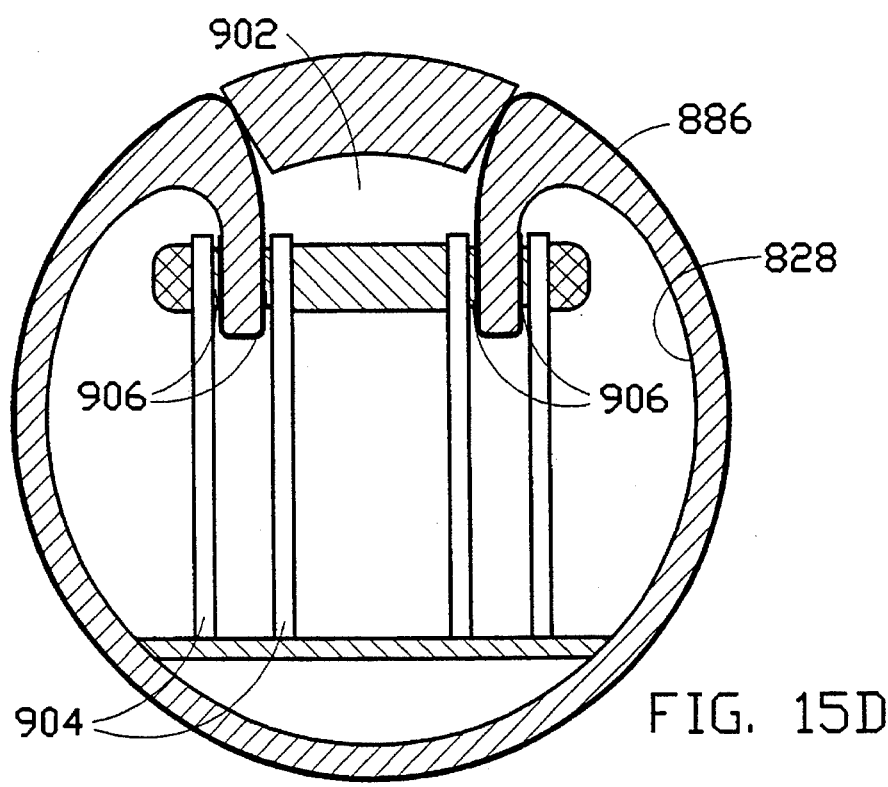
FIG. 15D is a generalized pictorial illustration of a further variation of the drum of FIGS. 13A and 14C.
Figure 15E:
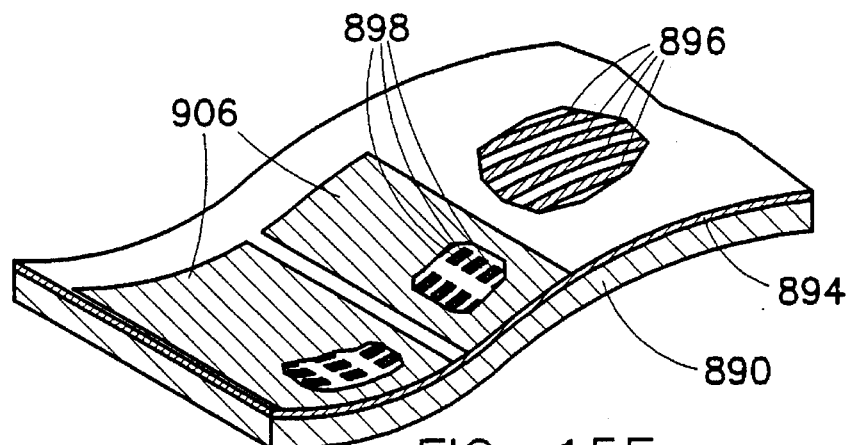
FIG. 15E is a partially cut-away illustration of part of the drum of FIG. 15D.

Reference is now made particularly to FIGS. 15D and 15E, which illustrate an alternative configuration of the conductive backing and the inner structure of drum 820 in accordance with an embodiment of the present invention.

The conductive backing comprises a multi-layer blanket 886 which includes a flexible dielectric carrier 890 and a further layer 894 on which is formed a plurality of conductive electrodes 896, where the electrodes terminate in a fan out array 898 of connectors. Conductive electrodes 896 together with fan out array 898 may be produced on layer 894 by photoetching, plasma etching, laser etching, mechanical etching, electroforming or a combination thereof.

Blanket 886 is wrapped around inner layer 828 of drum 820, with each blanket end being inserted into a opening 902. Fan out arrays 898 at the blanket ends are aligned with a secondary set of printed circuit boards 904 that are located within drum 820. Fan out arrays 898 at each blanket end may comprise one or more contact regions 906. Through the contact regions 906, electrodes of blanket 886 are electrically connected to secondary printed circuit boards 904. Typically, the electrical connection is made using elastomeric contact arrays as described hereinabove. Blanket 886 eliminates the need for a set of primary printed circuit boards. A thin adhesive layer may be used to ensure adhesion of dielectric carrier 890 to drum inner layer 828.

After a conductive backing has been produced by any of the methods described hereinabove with reference to any of FIGS. 15A–15E, or by any suitable alternate method, outer dielectric surface 824 is formed. Outer dielectric surface 824 is created by coating conductive backing 826 with a dielectric layer or layers resulting in a uniform smooth outer layer with predetermined total thickness.

The capacitance of outer dielectric surface 824 is determined by the dielectric constant of the material or materials used in the coating process and the accumulated thickness of all of the coating layers.

Typically, the total thickness of outer dielectric surface 824 is between 10–50 microns. The capacitance of outer dielectric surface 824 plays an important role in determining the final resolution of the latent image and the maximum charge density that can be accumulated on the surface per the voltage applied to the conductive backing.

In addition to its dielectric properties, the material used for the outer dielectric coating should have appropriate surface energy, be sufficiently durable and abrasive resistant.

Various techniques may be used to create outer dielectric imaging layer 824 of drum 820. The specific method used is chosen to conform to the configuration of conductive backing 826 and the specific materials used. Prior to coating, the surface of conductive backing 826 may be chemically treated to prepare for coating with one or many thin dielectric layers.

Coating techniques may comprise fog spraying of dielectric polymeric-based solutions or dispersions. Typically, fog spraying is carried out while the drum is rotating. Alternatively, coating may be carried out using web coating techniques. Depending on the material of the conductive electrodes, either wet web coating (with a polymeric based solution, dispersion or two components) or hot melt web coating (using dielectric thermoplastic materials or glass) may be used.

After coating, each dielectric layer may be hardened using evaporation, a thermal process, or curing via radiation or heat, depending on the coating material used.

After all dielectric layers have been coated and hardened, a smooth uniform outer dielectric imaging layer 824, having an embedded conductive backing 826, remains.

Alternatively, outer dielectric surface 824 may be created by a rough casting of polymeric based materials or sintering of ceramics inside a preformed container. After the casting or sintering is complete, the container is removed, and all unnecessary coating material is machined away leaving a coating with a specified even thickness and a smooth outer layer.

Alternatively, coating techniques may comprise spreading of a dielectric adhesive onto the electrodes of conductive backing 826, thus filling all gaps. A thin dielectric film (such as polyester based films) of predetermined thickness may then be wrapped around the entire drum surface and pressure laminated to the conductive wires/adhesive surface. Following this step, the adhesive is cured leaving a flat dielectric outer imaging surface adhered to the electrodes.

Optionally any and all of the drums described herein may be provided with an additional thin dielectric outer coating, which preferably is disposable and easily replaceable. This coating, which may be formed of polyethylene terephthalate (PET, PETP) or any other suitable material, may have a thickness in the general range of 12 microns.

Figure 16:
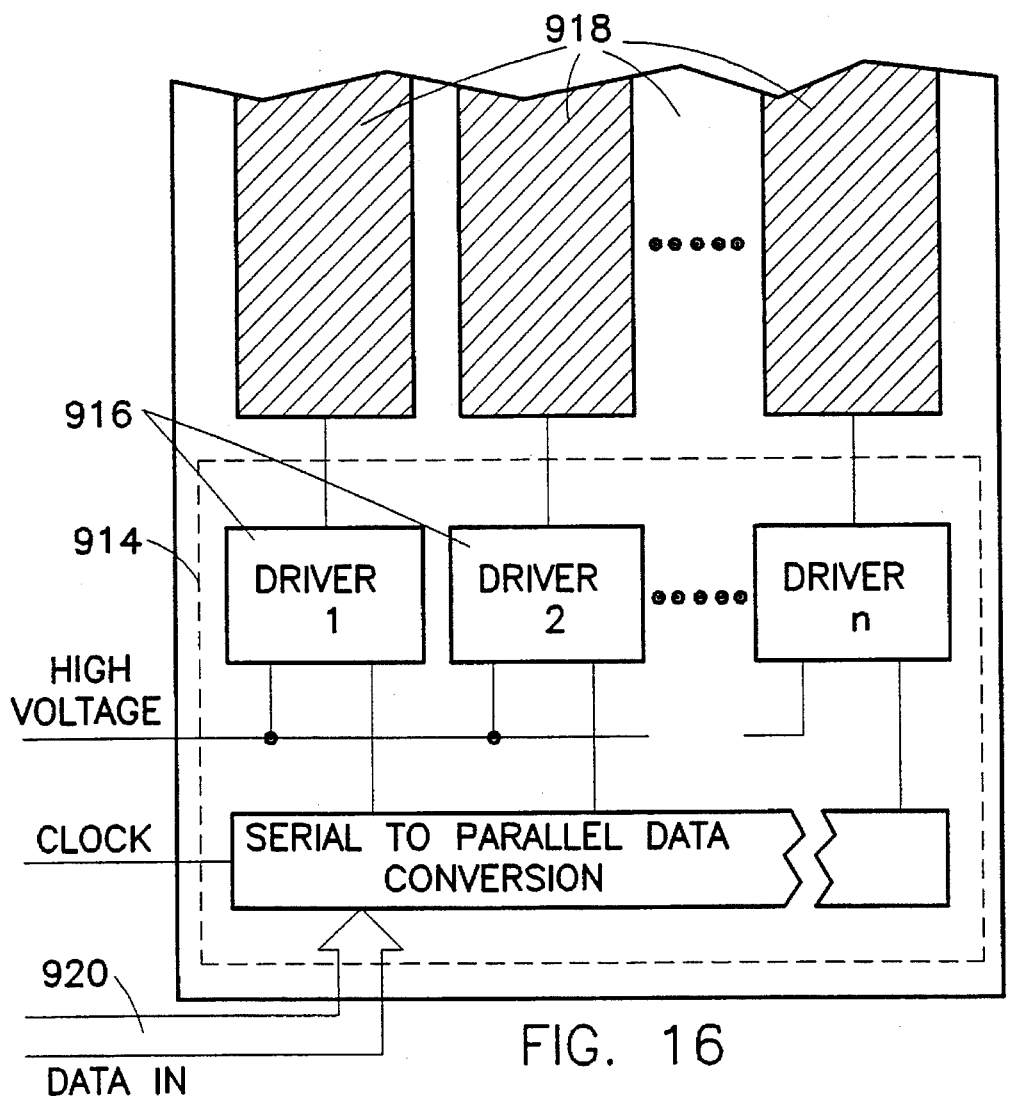
FIG. 16 is a schematic illustration of an alternate embodiment of the apparatus of FIG. 5.

Reference is now made to FIG. 16 which is a simplified schematic illustration of the imaging electronics of the printed circuit boards. The imaging electronics comprise a cascade 914 of multi-channel serial to parallel devices outputting to drivers 916. Each driver 916 provides a high voltage output, in the range of up to a few hundred volts, which drives a separate conductive electrode 918.

Data is input serially from an external data source, such as a computer, copier, scanner or facsimile receiver, to the imaging electronics via a data bus 920. Serial data, representing a pattern which is to be generated on the outer dielectric imaging surface of the drum, is typically fed to data bus 920 in 1, 8 or 10 byte words.

The data propagates along the cascade 914 of multi-channel serial to parallel converting devices. A single output of each device within cascade 914 corresponds to each conductive electrode 918. For example, if the conductive backing of a drum contains 6400 conductive electrodes, one hundred 64-channel devices or two hundred 32-channel devices may be employed in the cascade 914. Typically, the devices are evenly distributed over the printed circuit boards on which the imaging electronics are located.

After data representing one raster line of a pattern to be generated has been serial loaded across the cascade of multi-channel serial to parallel converters 914, the data is loaded in parallel to high voltage drivers 916. Based on the data, high voltage drivers 916 apply appropriate voltages to the electrodes.

Simultaneous with the application of the voltages to conductive electrodes 918, an Elongate Alternating Polarity Charge Source (EAPCS), of the type described in any of FIGS. 7A–10B, is activated.

The EAPCS may be placed in proximity to the outer dielectric imaging surface of a drum, such as drum 820 of FIG. 13A or drum 846 of FIG. 15A, and includes a well-defined edge positioned so that the drum rotates toward the edge. Charge is not supplied by the EAPCS to areas of the outer dielectric imaging surface of the drum that are beyond the edge of the EAPCS.

The EAPCS may be activated for a pulse duration containing tens of plasma cycles. This activation supplies charges to the outer dielectric imaging surface. The final charge accumulated on the outer dielectric imaging surface of the drum is a function of the voltage signals applied to conductive electrodes 918 over the pulse duration. The area of charge accumulation is bounded by the defined edge of the EAPCS.

During EAPCS activation, data representing the next raster line of the image to be generated is serially loaded into cascade 914, but the data is not forwarded to high voltage drivers 916.

Prior to application of voltages corresponding to data for a subsequent raster line of the image, the drum rotates slightly to position the EAPCS for the next line. After rotation of the drum, the new line data is sent to high voltage drivers 916 and the EAPCS is activated, again causing accumulation of a additional amount of charge, positive or negative, corresponding to the new line data that was fed to the devices. Areas that are beyond the boundary created by the defined edge of the charge source do not receive additional charge. Instead, they retain the charge that was previously accumulated.

The above-described line writing cycle repeats itself until a latent image of the entire pattern is generated.

Alternatively, the EAPCS may be operated continuously during the latent image generation process. During continuous operation of the EAPCS, the charge pattern is continuously refreshed. Conversely, when the EAPCS is operated in pulses, the charge pattern is refreshed during time intervals whose length determines the dimension of a single raster line of the image in the direction in which the drum rotates.

Figure 17:
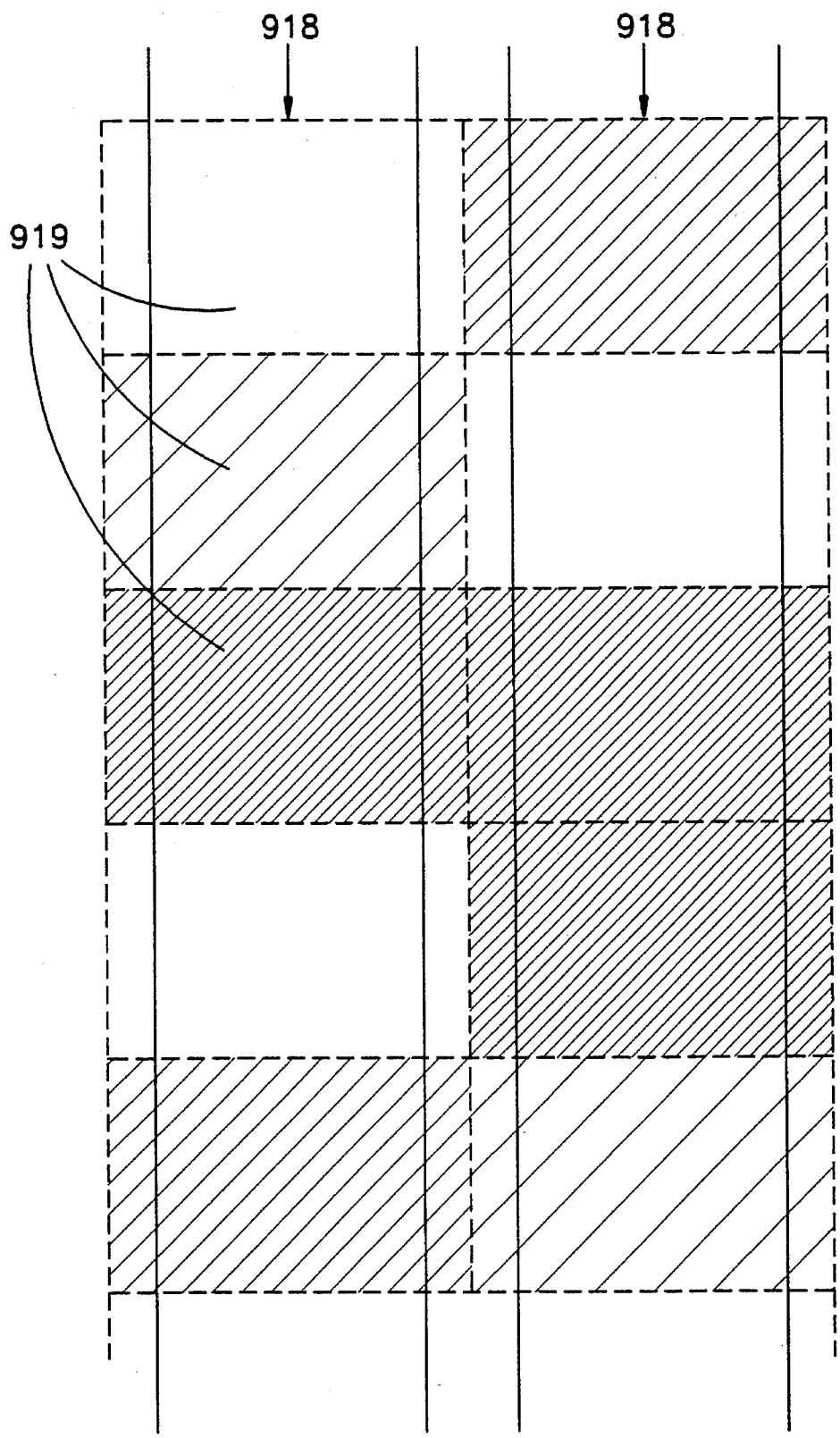
FIG. 17 is an illustration of a continuous tone pattern generated using the apparatus of FIG. 16.

Reference is now made to FIG. 17 which illustrates an image pattern comprising a plurality of pixels 919 along conductive electrodes 918, where the charge density of each pixel is determined by input data.

It is appreciated that the imaging electronics may be configured for either of the two primary methods of achieving optical density gradations for printing images, typically referred to as half-tone printing and continuous tone printing. Both printing methods are compatible with the drum configuration and imaging techniques described hereinabove. Continuous tone images are created by controlling the amount of toner, hence the shade, of each pixel. Half-tone images may be created using super-pixel patterns, where each super-pixel comprises several pixels and where each pixel is either toned or non-toned. Alternatively, half-tone images may be achieved using pulse-width and position modulation of each pixel whereby the size and incremental position of the toner deposited in each pixel is varied.

It is further appreciated that in accordance with the writing techniques described herein, the imaging electronics and the level of high voltage employed can accommodate a variety of toners and toning techniques, including liquid and dry toners.

One method for achieving continuous tone images using drum 820 and the writing techniques described hereinabove is described hereinbelow.

Through amplitude modulation of the voltages applied to the electrodes 918 by the drivers 916 during EAPCS activation, the total amount of charge accumulated may be precisely determined.

A charge pattern containing a two-dimensional array of pixels, where the charge density for each pixel can be selected, is created using the latent image writing techniques and drum described hereinabove. Each pixel is defined as the minimum unit that can be addressed in a line. The number of pixels in the direction of the longitudinal axis of the drum is equal to the number of conductive electrodes therein. The shape of the pixels is determined by the geometry of the conductive electrodes, the thickness of the outer dielectric layer, and the edge definition of the EAPCS. Using appropriate toners and toning techniques, a continuum of shades can be achieved for each pixel.

A benefit of creating continuous tone images using the writing techniques and drum described hereinabove is that the total charge density at any pixel location is a function of the voltage applied to the conductive electrode during EAPCS activation. Therefore, the charge density is not sensitive to environmental factors, such as temperature, humidity, light, etc. Typically, line-printing techniques, for example LED Arrays in electrophotography, ion guns in ionography, are based on imagewise writing heads which are typically composed of pixel-sized writing sources. Dissimilarities between any of the pixel-sized writing sources comprising an imaging head may result in image non-uniformities.

The line printing techniques described herein do not employ an imagewise writing head. Instead, the charge density for each pixel location is determined by the voltage applied to the conductive electrodes. Ordinary fluctuations in the charge source do not cause non-uniformities in the image. Therefore, the charge density can be closely controlled and repeatability is achievable.

Figure 18A:
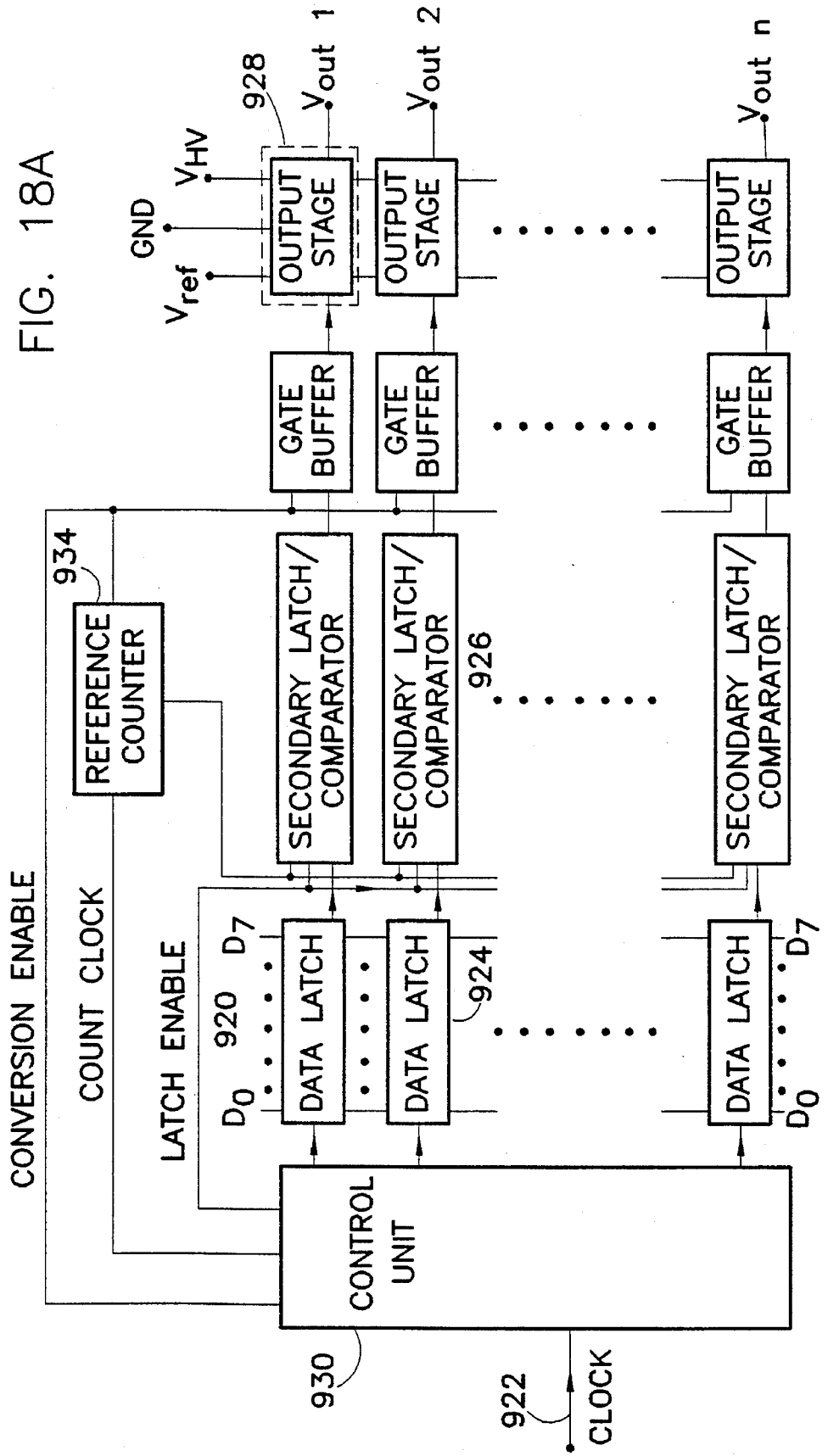
FIGS. 18A and 18B are block diagram illustrations of the architecture of the apparatus of FIG. 16 when used for producing a continuous tone pattern.

Reference is now made to FIG. 18A which illustrates an example of the circuitry of basic continuous tone imaging apparatus that can be used to perform amplitude modulation for each conductive electrode 918. FIG. 18A depicts one preferred embodiment of the apparatus of FIG. 16, which is particularly suitable for use in generating continuous tone images.

The basic circuitry typically comprises one among a multiplicity of units which make up the cascade 914 (FIG. 16). Typically, for high quality continuous tone imaging, 8 bit inputs to the data bus are used, where each 8-bit data word corresponds to the desired voltage level for one conductive electrode. When 8-bit word input is used, 256 different voltage levels are available for each conductive electrode corresponding to 256 different shades for each pixel. Since up to four different latent images, one representing each different print color, such as cyan, magenta, yellow, black, may be used for each final color print image, 256 shades for each color translates to millions of possible color combinations.

Data is serially loaded from data bus 920 and propagated at a high rate, typically using loading clock 922, which operates at few tens of MHz, into each data latch 924 of each device. Each data latch 924 corresponds to one secondary latch 926 and one output voltage stage 928.

Once an entire line of data has been loaded into the data latches 924, the line data is transferred in parallel from data latches 924 to secondary latches 926. Transferring the data to secondary latches 926 allows new data representing the next line of the image to be loaded into the data latches 924. Concurrently, all data in secondary latches 926 undergoes a parallel digital to analog high voltage conversion.

The outputs of secondary latches 926 are supplied to respective gate buffers 927. The outputs of gate buffers 927 are supplied to respective output stages 928. A control unit 930 controls the timing and triggering of the subsystems in each device.

The conversion cycle begins by setting a binary reference counter 934 on each device to 00000000. In predefined increments, a clock signal is sent from control unit 930 to reference counter 934 incrementing reference counter 934 by units of 1 until a maximum level of 11111111 is reached. Each increment is associated with one of 256 possible output levels.

Figure 18B:
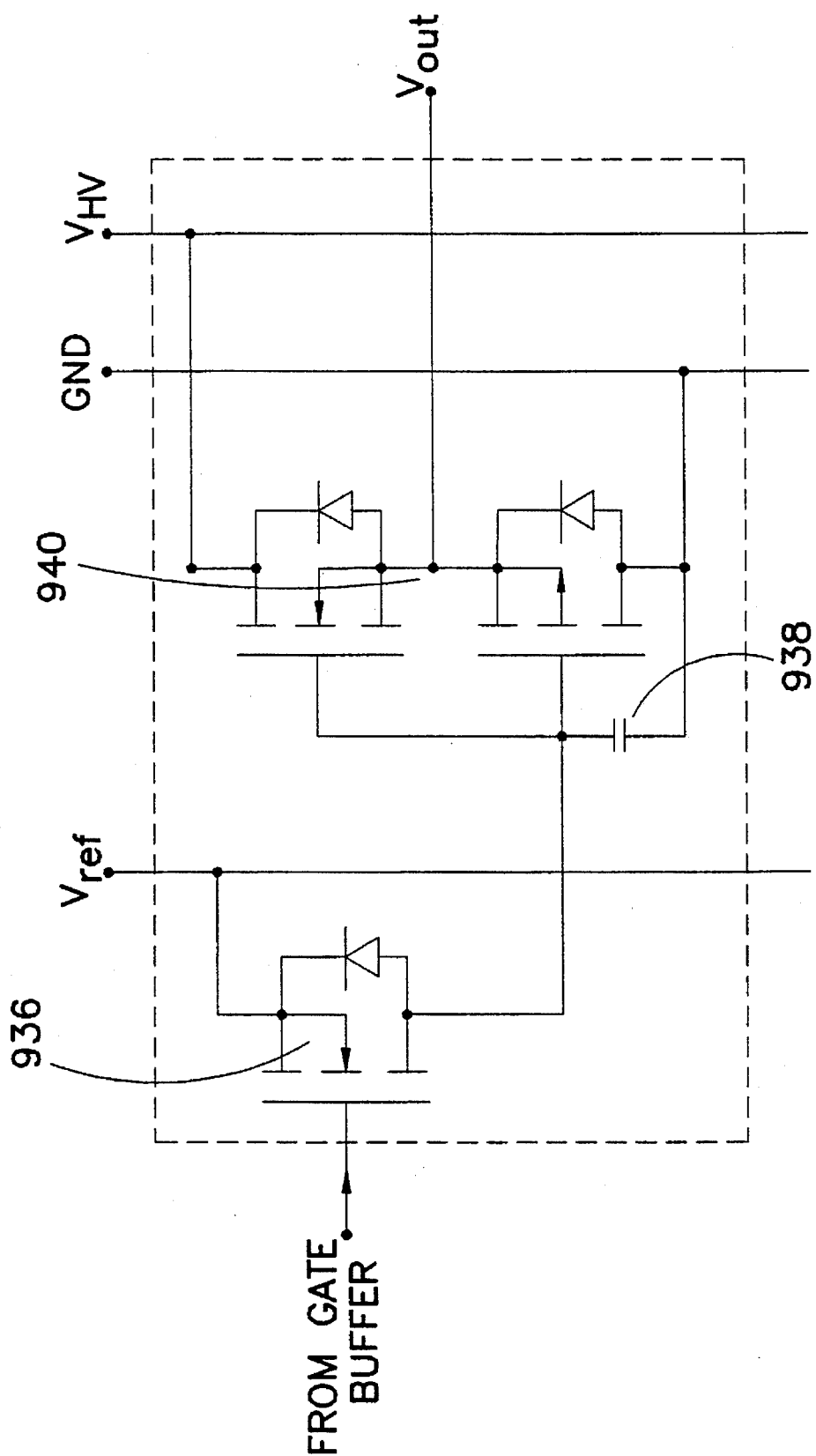

Reference is now made to FIG. 18B which is a detailed circuit diagram of the output stage 928 of the basic continuous tone circuitry apparatus of FIG. 18A. At output stage 928, which employs high-voltage CMOS technology, digital data from secondary latch 926 is converted to an analog output voltage $V_{out}$ as follows:

A reference voltage $V_{ref}$ is applied to output stages 928 of all devices in cascade 914. Voltage $V_{ref}$ is applied via charging transistors 936 causing hold capacitors 938 in each output stage 928 to experience a rise in voltage.

Each time the value in reference counter 934 is incremented, the digital information in secondary latch 926 associated with each output stage 928 is compared with the value in reference counter 934. When reference counter 934 reaches the value held by secondary latch 926, the charging transistor 936 is cut off thereby terminating charging of the hold capacitor 938 of that output stage 928.

The output voltage level, $V_{out}$, of each voltage follower 940 associated with each output stage 928 corresponds to the voltage achieved by hold capacitor 938. Typically voltage followers 940 are capable of sinking and sourcing current from conductive electrodes 918 (FIG. 16) to which they are connected.

Typically, $V_{out}$ is maintained constant across conductive electrodes 918 during the EAPCS activation. Once the EAPCS is made non-active, $V_{ref}$ is reduced to zero, allowing hold capacitors 938 to discharge, thereby discharging the corresponding conductive electrode 918. The total charge accumulated on a given region of the conductive electrode 918 prior to discharge is determined by the data input to data latch 924 associated with the corresponding output stage 928. After $V_{ref}$ rises back to its normal level, a conversion cycle for the next line of data is begun.

Figure 19:
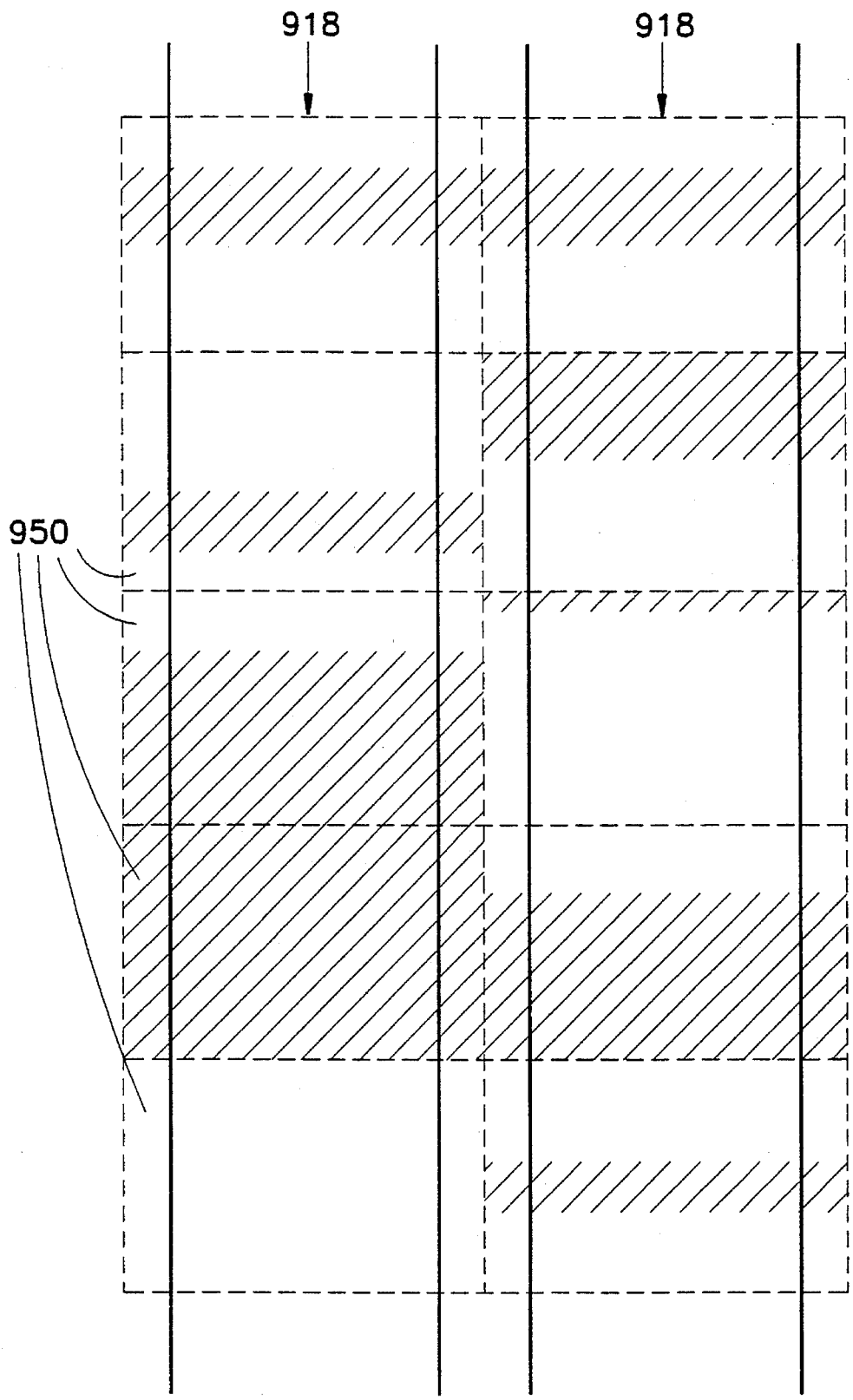
FIG. 19 is an illustration of a halftone pattern generated using the apparatus of FIG. 16.

Reference is now made to FIG. 19 which illustrates a half-tone image pattern comprising a plurality of pixels 950, delimited by dashed lines, along conductive electrodes 918 (FIG. 16). The image pattern may be generated using pulsewidth modulation techniques and image writing techniques described hereinabove where an EAPCS is activated continuously during the image writing cycle.

Pulsewidth modulation includes controlling the fractional area to be charged in each pixel 950 and micropositioning of the charged areas within pixel 950. In the example shown, the charged areas of the pixel are shaded and the substantially uncharged areas appear unshaded. Typically, the charge density in charged areas is the saturation level corresponding to the voltage applied to conductive electrodes 918.

Figure 20A:
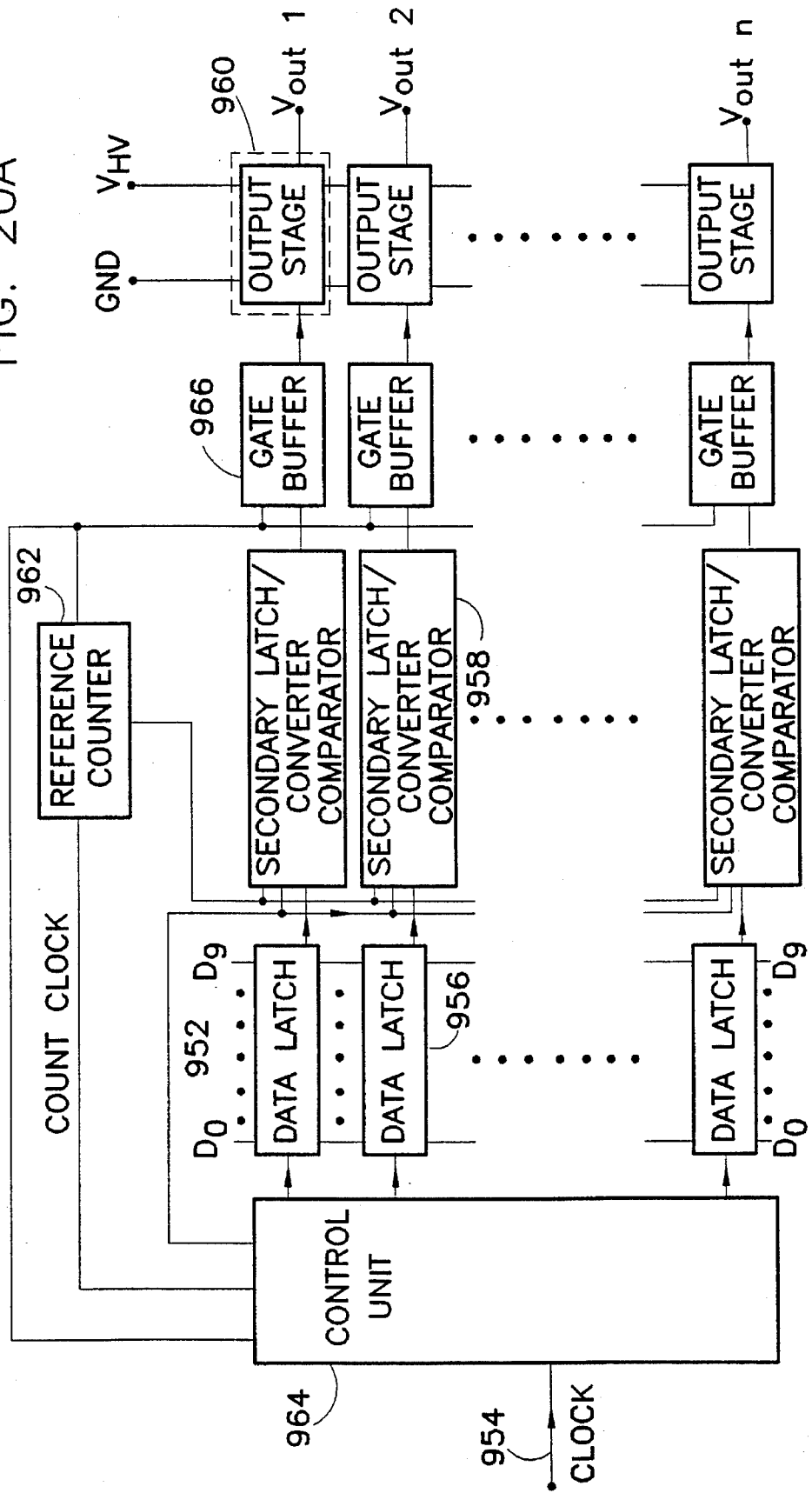
FIGS. 20A and 20B are block diagram illustrations of the architecture of the apparatus of FIG. 16 when used for producing a pulse-width modulated half-tone pattern.
Figure 20B:
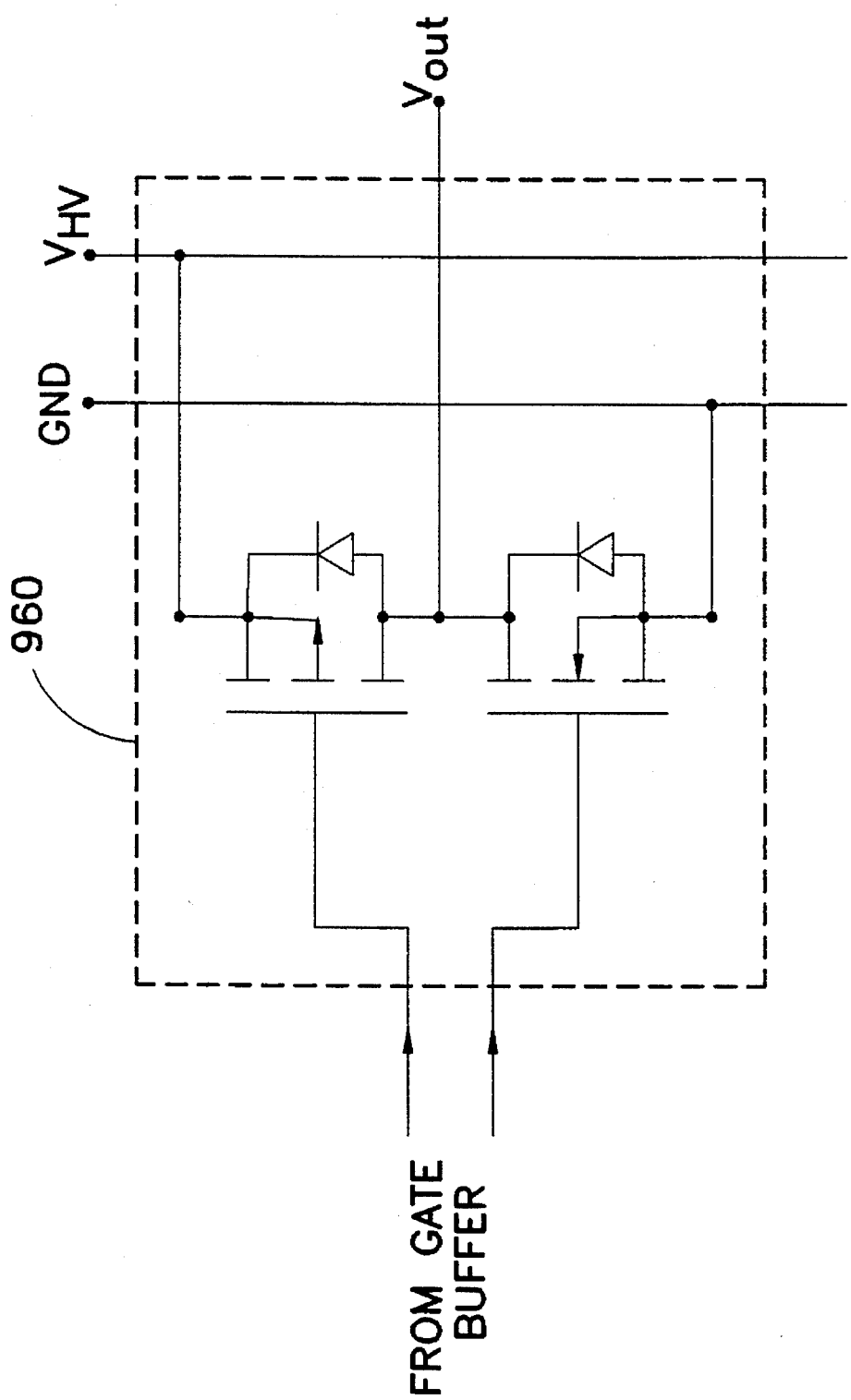

Reference is now made to FIGS. 20A and 20B which illustrate an example of basic pulsewidth modulation imaging apparatus that can be used to perform pulsewidth modulation for imaging pixels generated on conductive electrodes 918 (FIG. 16). FIGS. 20A and 20B depict a further preferred embodiment of the apparatus of FIG. 16 which is particularly suitable for use in generating half tone images having multiple gray levels.

The basic circuitry typically comprises one among a multiplicity of units which make up the cascade 914 (FIG. 16). Typically, for half-tone images with multiple gray levels, 10 bit inputs to the data bus may be used. Eight of the ten bits represent 256 possible levels for the fill fraction of each pixel. The remaining two bits represent four possibilities for micropositioning of the fill area within the pixel. Alternatively, any other suitable multi-bit input data combination may be used, with certain bits representing the fill fraction and the remaining bits representing the positioning.

Micropositioning of the fill area is used to achieve images having high spatial frequency. High spatial frequency enhances the appearance of toned images and enables simulation of continuous tone in half-tone images. Four possibilities for micropositioning represents a reasonable minimum necessary to ensure desirable variation in the fill location at adjacent pixels located on adjacent conductive strips as described in FIG. 6A–6C above. For a fill area that is greater than half the pixel area, the location may be adjacent the leading or trailing edge of the pixel. For a fill area that is less than half the pixel area, the location typically begins or ends at the middle of the pixel and extends towards the leading or trailing edge.

Conversion of input data to voltages on the conductive strips 918 by means of pulse width modulation is preferably carried out as described hereinbelow:

Data is serially loaded from a data bus 952 and propagated at a high rate, typically using loading clock 954 which operates at a few tens of MHz, into each data latch 956 of each unit in cascade 914. Each data latch 956 corresponds to one secondary latch 958 comprising a converter and comparator and one output stage 960. Once an entire line of data has been loaded into data latches 956, the line data is transferred in parallel from data latch 956 to secondary latches 958.

Transferring the data to secondary latches 958 allows new data representing the next line of the image to be loaded into data latches 956. Based on the above-described positioning bits, the data in secondary latches 958 is typically converted to two words describing the beginning and end locations of the fill region of the pixel.

The outputs of secondary latches 958 are supplied to respective gate buffers 966. The outputs of gate buffers 966 are supplied to respective output stages 960. A control unit 964 controls the timing and triggering of the subsystems in each device.

The conversion cycle begins by setting a binary reference counter 962 on each device to 00000000. In predefined increments, a clock signal is sent from control unit 964 to reference counter 962, incrementing reference counter 962 by units of 1 until a maximum level of 11111111 is reached. Each increment is associated with one of 256 possible pulse width outputs.

Each time the value in reference counter 962 is incremented, the two word digital information in secondary latch 958 associated with each output stage 960 and the value in reference counter 934 are compared. When reference counter 962 reaches the value held by secondary latch 958 for the beginning location of the pixel fill area, a signal is sent from secondary latch 958 to output gate buffer 966 and the output stage voltage increases to $V_{HV}$. When reference counter 962 reaches the value held by secondary latch 958 for the end location of the pixel fill area, a signal is sent from secondary latch 958 to output gate buffer 966 and the output stage voltage goes to ground.

Typically output stage 960 comprises push-pull high voltage MOSFETS capable of sinking and sourcing current from conductive electrodes 918 to which the output stages 960 are connected.

It is appreciated that half-tone color images can be generated by creating one half-tone image for each of the four printing colors.

It is further appreciated that during half-tone printing using the pulsewidth modulation imaging techniques described hereinabove relatively large numbers of grey levels are achieved without reducing spatial resolution. Typically, half-tone techniques using super-pixel and screening methods require a tradeoff between the number of gray levels and the spatial resolution.

Figure 21:
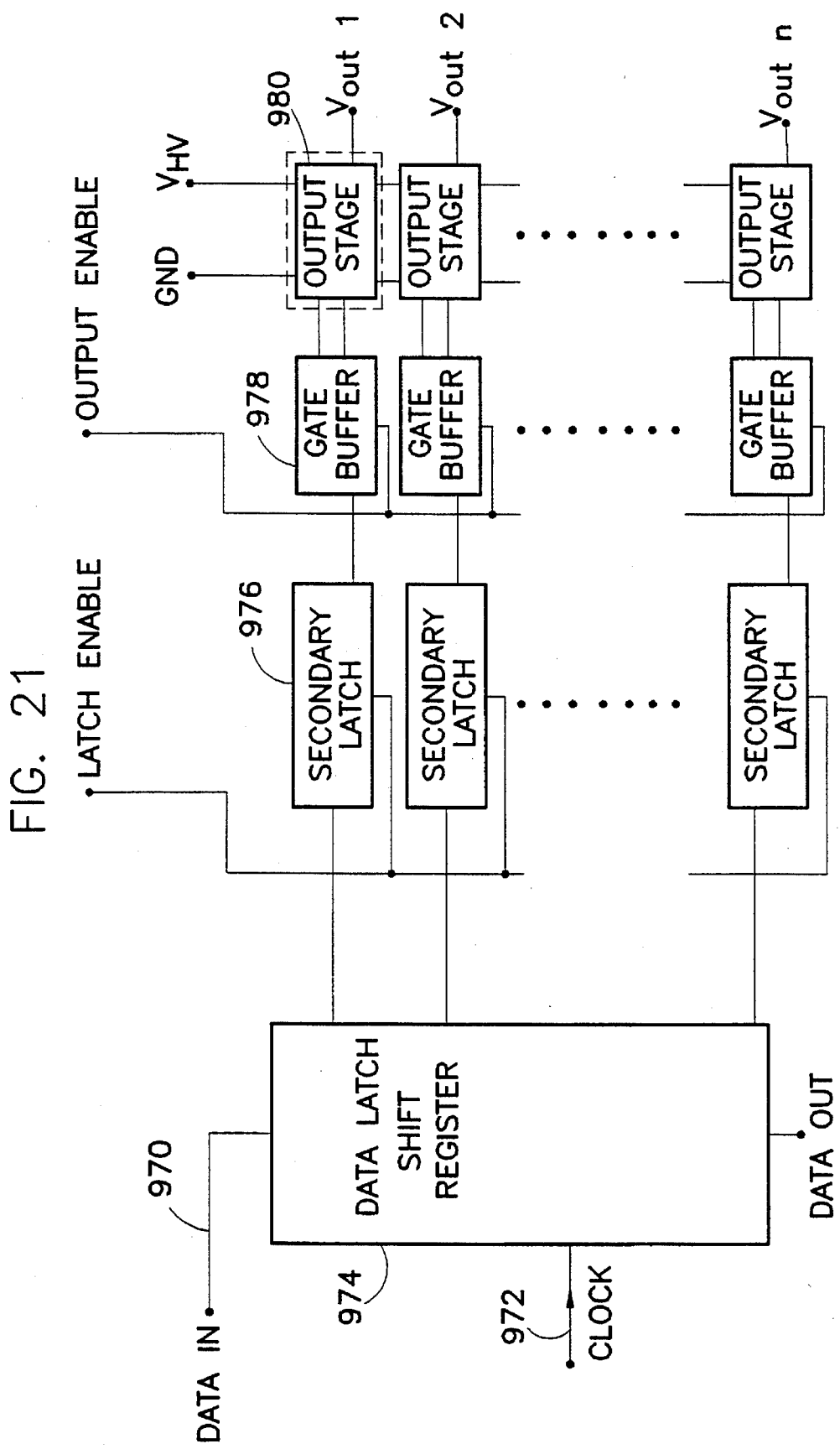
FIG. 21 is a block diagram illustration of the architecture of the apparatus of FIG. 16 when used for producing a super-pixel halftone pattern.

Reference is now made to FIG. 21 which illustrates an example of circuitry of basic apparatus that can be used to generate an alternate type of half-tone image on conductive electrodes 918. FIG. 21 depicts a further preferred embodiment of the apparatus of FIG. 16 which is particularly suitable for use in generating super-pixel half tone images based on screening methods.

The basic circuitry typically comprises one among a multiplicity of units which make up the cascade 914 (FIG. 16). Typically, each such unit receives a one-bit input from a data bus 970. Based on the binary information supplied by the data bit, each conductive electrode 918 receives either high voltage or low voltage during the EAPCS activation. In this embodiment, the EAPCS can be activated in pulse mode or continuous mode.

Data is serially loaded from a data bus 970 and propagated at a high rate, typically using a loading clock 972 which operates at few tens of MHz, into a shift register 974. Once all the data for one line has been loaded into shift register 974 of all units in the cascade 914, the data is transferred in parallel to secondary latches 976. A signal is sent from a secondary latch 976 to an output gate buffer 978 indicating whether output stage 980 should apply high or low voltage to conductive strip 918.

Typically output stage 980 comprises push-pull high voltage MOSFETS capable of sinking and sourcing current from conductive electrodes 918 to which the output stages 980 are connected. Output stage 980 may be of the type shown in FIG. 20B.

It will be appreciated by persons skilled in the art that the present invention is not limited to what has been particularly shown and described hereinabove. Rather the scope of the present invention is defined only by the claims which follow:

I claim:

1. Imaging drum apparatus comprising:

a generally cylindrical inner support structure;

a plurality of electrodes arranged over said cylindrical inner support structure and defining at least one azimuthally delimited imaging region and at least one azimuthally delimited non-imaging region;

a latent image receiving and retaining substrate overlying said electrodes; and imaging electronics disposed interiorly of said plurality of electrodes and electrically coupled thereto.

2. Apparatus according to claim 1 and wherein said imaging electronics comprises:

cascaded digital circuitry for serial to parallel data conversion; and multi-channel high voltage circuitry receiving digital parallel input from said digital circuitry and providing output analog voltage signals.

3. Apparatus according to claim 1 and wherein said imaging electronics are mounted on a plurality of printed circuit boards having connectors.

4. Apparatus according to claim 1 and also including: a non-imagewise charge source capable of supplying a flow of non-visible charges of either polarity, said flow having at least one well-defined elongate edge.

5. Imaging drum apparatus comprising:

a generally cylindrical inner support structure;

a plurality of electrodes at least partially embedded in a generally insulating dielectric medium overlying said cylindrical inner support structure;

a latent image receiving and retaining substrate overlying said electrodes;

imaging electronics disposed interiorly of said plurality of electrodes and electrically coupled thereto and comprising cascaded digital circuitry for serial to parallel data conversion; and multi-channel high voltage circuitry receiving digital parallel input from said digital circuitry and providing output analog voltage signals, wherein said output analog voltage signals of said multi-channel high voltage circuitry comprise:

pulse-duration modulated binary voltage levels for forming of continuous tone images by pixel size and position modulation.

6. Apparatus according to claim 2 and wherein said output analog voltage signals of said multi-channel high voltage circuitry comprise:

a continuum of voltage levels for forming of continuous tone images by optical density modulation.

7. Imaging drum apparatus comprising:

a generally cylindrical inner support structure; and a plurality of generally circularly disposed, mutually insulated, electrodes arranged over a cylindrical surface defined by said support structure, and defining at least one azimuthally delimited imaging region and at least one azimuthally delimited non-imaging region.

8. Apparatus according to claim 7 and wherein said plurality of generally circularly disposed electrodes define at least two azimuthally delimited imaging regions.

9. Apparatus according to claim 1 and wherein said plurality of electrodes are removably coupled to said imaging electronics using high density connectors.

10. Apparatus according to claim 7 and also including: a non-imagewise charge source capable of supplying a flow of non-visible charges of either polarity, said flow having at least one well-defined elongate edge.

11. A method for fabricating an imaging drum assembly comprising the steps of:
   providing a cylindrical inner support structure arranged about a drum axis;
   forming over said cylindrical inner support structure a plurality of generally circularly disposed, mutually insulated, electrodes in a single layer defining at least one azimuthally delimited imaging region and at least one azimuthally delimited non-imaging region;
   providing interconnects for said plurality of electrodes; and
   forming over said plurality of electrodes an image receiving and retaining substrate.

12. A method for fabricating an imaging drum assembly comprising the steps of:
   providing a cylindrical inner support structure arranged about a drum axis;
   forming over said cylindrical inner support structure a plurality of generally circularly disposed, mutually insulated, electrodes in a single layer;
   providing interconnects for said plurality of electrodes; and
   forming over said plurality of electrodes an image receiving and retaining substrate,
   and wherein the step of forming a plurality of generally circularly disposed, mutually insulated electrodes comprises the steps of:
   forming an inner dielectric layer over said cylindrical inner support structure;
   winding a continuous wire about the inner dielectric layer;
   thereafter bonding the wire to interconnects at plural locations; and
   thereafter cutting the wire at plural locations.

13. A method for fabricating an imaging drum assembly comprising the steps of:
   providing a cylindrical inner support structure arranged about a drum axis;
   forming over said cylindrical inner support structure a plurality of generally circularly disposed mutually insulated, electrodes in a single layer;
   providing interconnects for said plurality of electrodes; and
   forming over said plurality of electrodes an image receiving and retaining substrate,
   and wherein the step of forming a plurality of generally circularly disposed, mutually insulated electrodes comprises the steps of:
   providing a flexible blanket having a plurality of mutually insulated conductive electrodes formed thereon;
   wrapping said flexible blanket about the cylindrical inner support structure; and
   securing the flexible blanket in place.

14. A method for line printing comprising the steps of:
   providing a drum including an outer image receiving and retaining substrate;
   providing a plurality of electrodes, at least partially embedded in a generally insulating dielectric medium, underlying said image pattern receiving and retaining substrate;
   providing imaging electronics interiorly of said electrodes and coupled thereto;
   applying information-bearing voltage signals to said plurality of electrodes; and
   operating a non-imagewise charge source to apply a flow of non-visible charges to said outer receiving and retaining substrate, said flow having at least one well-defined elongate edge, thereby causing a non-visible charge image to be retained on said outer image receiving and retaining substrate; wherein
   the two dimensional spatial resolution Of said non-visible charge image is generally determined in one direction by said elongate edge and in a second dimension by the density of said electrodes.

15. A method according to claim 14 and wherein said step of operating said charge source comprises continuous operation of said charge source.

16. A method according to claim 14 and wherein said step of operating said charge source comprises pulsed operation of said charge source.

17. A method according to claim 11 and also comprising the steps of:
   providing imaging electronics interiorly of the drum; and
   coupling said imaging electronics to said plurality of electrodes.

18. A method according to claim 17 and wherein said imaging electronics are removably coupled to said electrodes.

19. Imaging drum apparatus comprising:
   a generally cylindrical inner support structure; and
   a plurality of electrodes arranged over a cylindrical surface defined by said support structure, and defining at least one imaging region and at least one connection region outside of said imaging region.

20. Apparatus according to claim 19 and also including:
   a non-imagewise charge source capable of supplying a flow of non-visible charges of either polarity, said flow having at least one well-defined elongate edge.

21. Apparatus according to claim 19 and also including imaging electronics coupled to said plurality of electrodes.

22. Imaging drum apparatus comprising:
   a generally cylindrical inner support structure;
   a plurality of continuous elongate electrodes at least partially embedded in a generally insulating dielectric medium overlying said cylindrical inner support structure, said plurality of electrodes being arranged in a single layer; and
   a latent image receiving and retaining substrate overlying said plurality of elongate electrodes.

23. Apparatus according to claim 22 and also including imaging electronics coupled to said plurality of electrodes.

24. Apparatus according to claim 22 and also including:
   a non-imagewise charge source capable of supplying a flow of non-visible charges of either polarity, said flow having at least one well-defined elongate edge.

25. Imaging drum apparatus comprising:
   a generally cylindrical inner support structure;

a layer of insulative material formed over said support structure;

a plurality of continuous elongate electrodes at least partially embedded in a generally insulating dielectric medium overlying said layer of insulative material in a single layer; and a latent image receiving and retaining substrate overlying said elongate electrodes.

26. Apparatus according to claim 25 and also including imaging electronics coupled to said plurality of electrodes.

27. Apparatus according to claim 25 and also including:

a non-imagewise charge source capable of supplying a flow of non-visible charges of either polarity, said flow having at least one well-defined elongate edge.

* * * * *